US010562591B2

(12) United States Patent
Sugano et al.

(10) Patent No.: US 10,562,591 B2
(45) Date of Patent: Feb. 18, 2020

(54) POWER UNIT FOR VEHICLE INCLUDING A CLUTCH ACTUATOR

(71) Applicant: HONDA MOTOR CO., LTD., Tokyo (JP)

(72) Inventors: Takeshi Sugano, Asaka (JP); Yohei Endo, Kawagoe (JP); Kinya Mizuno, Asaka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 15/879,719

(22) Filed: Jan. 25, 2018

(65) Prior Publication Data
US 2018/0244349 A1 Aug. 30, 2018

(30) Foreign Application Priority Data
Feb. 28, 2017 (JP) .................................. 2017-035836

(51) Int. Cl.
*B62M 25/08* (2006.01)
*B62M 7/02* (2006.01)
*B62M 11/06* (2006.01)
*F16D 48/06* (2006.01)
*F16H 61/688* (2006.01)
(Continued)

(52) U.S. Cl.
CPC .............. *B62M 25/08* (2013.01); *B62M 7/02* (2013.01); *B62M 11/06* (2013.01); *F16D 48/06* (2013.01); *F16H 61/688* (2013.01); F02B 61/02 (2013.01); F02B 75/22 (2013.01); F02B 77/11 (2013.01); F16H 63/18 (2013.01); F16H 2063/025 (2013.01)

(58) Field of Classification Search
CPC ..... B62M 7/02–06; F02B 61/02; F02B 75/22; F16D 28/00; F16D 27/00; F16D 27/14; B60K 17/02

USPC ........................................ 192/82 R, 83, 84.1
See application file for complete search history.

(56) References Cited

U.S. PATENT DOCUMENTS

2006/0160660 A1* 7/2006 Zenno .................... B60W 10/02
477/114
2006/0169562 A1* 8/2006 Kosugi ................... F16D 28/00
192/83
(Continued)

FOREIGN PATENT DOCUMENTS

| DE | 102007043152 A1 | 5/2008 |
| DE | 102007049534 A1 | 6/2008 |
| JP | 2008-110665 A | 5/2008 |

OTHER PUBLICATIONS

German Office Action, dated Jan. 9, 2019, for German Application No. 102018101146.6, with an English translation.

*Primary Examiner* — Erick R Solis
*Assistant Examiner* — Robert A Werner
(74) *Attorney, Agent, or Firm* — Birch, Stewart, Kolasch & Birch, LLP

(57) ABSTRACT

A power unit for a vehicle includes an engine that is a power source, a gear shift apparatus, a twin clutch type transmission that intermittently switches power transmission between the engine and the gear shift apparatus, and a clutch actuator that controls intermittent switching of the twin clutch type transmission, the engine includes a crankcase and a pair of cylinders installed on the crankcase so that a V-bank is formed therebetween, and the clutch actuator is installed on the cylinders so that the clutch actuator overlaps a region of the V-bank.

8 Claims, 13 Drawing Sheets

(51) Int. Cl.
*F16H 63/18* (2006.01)
*F16H 63/02* (2006.01)
*F02B 61/02* (2006.01)
*F02B 75/22* (2006.01)
*F02B 77/11* (2006.01)

(56) References Cited

U.S. PATENT DOCUMENTS

| | | | |
|---|---|---|---|
| 2008/0099297 A1 | 5/2008 | Iwashita et al. | |
| 2008/0099305 A1* | 5/2008 | Ogasawara | F16D 25/0638 192/82 R |
| 2008/0128239 A1* | 6/2008 | Ogasawara | B60K 17/02 192/48.611 |
| 2011/0073433 A1* | 3/2011 | Tsukada | F16D 25/086 192/85.01 |

* cited by examiner

POWER UNIT FOR VEHICLE INCLUDING A CLUTCH ACTUATOR

CROSS-REFERENCE TO RELATED APPLICATION

Priority is claimed on Japanese Patent Application No. 2017-035836, filed Feb. 28, 2017, the content of which is incorporated herein by reference.

BACKGROUND

Field of the Invention

The present invention relates to a power unit for a vehicle.

Description of Related Art

In the related art, a power unit for a vehicle is disclosed in, for example, Japanese Unexamined Patent Application, First Publication No. 2008-110665. In Japanese Unexamined Patent Application, First Publication No. 2008-110665, a configuration in which a clutch actuator configured to control connection-disconnection switching of a clutch is disposed on an upper section of a clutch cover coupled to a side portion of a crankcase is disclosed.

SUMMARY

However, since the clutch actuator is relatively large for auxiliary machinery installed in an engine, there is a room for improvement regarding compatibility between protection of a clutch actuator and improvement of exterior design properties in the power unit for a vehicle.

The present invention is provided to make protection of a clutch actuator and improvement of exterior design properties in a power unit for a vehicle compatible.

A power unit for a vehicle according to the present invention employs the following configuration.

(1) A power unit for a vehicle according to the present invention includes an internal combustion engine that is a power source, a transmission device, a clutch apparatus that intermittently switches power transmission between the internal combustion engine and the transmission device, and a clutch actuator that controls intermittent switching of the clutch apparatus, wherein the internal combustion engine includes a crankcase, and a plurality of cylinders installed on the crankcase so that a V-bank is formed therebetween, and at least a portion of the clutch actuator is installed on the crankcase or the cylinder so that the portion of the clutch actuator overlaps with a region of the V-bank.

(2) In the above mentioned aspect of (1), entire of the clutch actuator may be accommodated within a width of a pair of cylinders that constitute the V-bank.

(3) In the aspect of above mentioned (1) or (2), a plurality of clutch actuators may be disposed such that at least a portion of each of the clutch actuators overlap with each other when seen in a plan view.

(4) In the aspect of above mentioned (1) or (2), a plurality of clutch actuators may be disposed parallel and adjacent to each other when seen in a plan view.

(5) In the aspect of above mentioned (3) or (4), the clutch actuator may include an electromagnetic coil section, and a valve body section having a diameter smaller than the electromagnetic coil section, and the plurality of clutch actuators may be disposed in a state the valve body sections are close to each other.

(6) In the aspect of above mentioned (1), (2) or (4), the clutch actuators may be disposed to stand up on the crankcase positioned on a bottom section of the region of the V-bank.

(7) In the aspect of above mentioned (1), (2) or (4), a plurality of clutch actuators may be disposed parallel to any one of the pair of cylinders that constitute the V-bank.

(8) In the aspect of any one of above mentioned (1) to (7), the internal combustion engine may be a water-cooling engine, and the pair of cylinders that constitute the V-bank may be water-cooled.

According to the above mentioned aspect of (1), as at least a portion of the clutch actuator is installed in the crankcase or the cylinder so as to overlap the region of the V-bank when seen in a plan view, since large expansion of the clutch actuator toward a side portion of the crankcase can be minimized, the clutch actuator can be protected. In addition, since the clutch actuator can be made inconspicuous, exterior design properties can be improved. Accordingly, protection of the clutch actuator and improvement of the exterior design property are compatible.

According to the above mentioned aspect of (2), as the entire of the clutch actuator is accommodated within the width of the pair of cylinders that constitute the V-bank, since the clutch actuator does not expand outside of the width of the pair of cylinders, the clutch actuator can be sufficiently protected by the pair of cylinders.

According to the above mentioned aspect (3), since the plurality of clutch actuators are disposed such that at least a portion of each of the plurality of clutch actuators overlap with each other when seen in a plan view, in comparison with a case in which a plurality of clutch actuators are disposed to be separated from each other when seen in a plan view, an occupation area taken up by the plurality of clutch actuators can be reduced when seen in a plan view. For this reason, the plurality of clutch actuators can be easily accommodated in the region of the V-bank, and a degree of freedom when disposing the plurality of clutch actuators can be increased.

According to the above mentioned aspect of (4), as the plurality of clutch actuators are disposed parallel and adjacent to each other when seen in a plan view, in comparison with the case in which the plurality of clutch actuators are disposed in parallel vertically when seen in a plan view, since an overall vertical width of the plurality of clutch actuators can be reduced, a center of gravity of the power unit can be minimized to a low level.

According to the above mentioned aspect of (5), since the clutch actuator includes the electromagnetic coil section and the valve body section having a diameter smaller than that of the electromagnetic coil section and the plurality of clutch actuators are disposed in a state the valve body sections are close to each other, in comparison with the case in which the plurality of clutch actuators are disposed such that the electromagnetic coil sections are close to each other, an occupation area taken up by the plurality of clutch actuators can be reduced. For this reason, the plurality of clutch actuators can be easily accommodated within the region of the V-bank, and a degree of freedom when disposing the plurality of clutch actuators can be increased.

According to the above mentioned aspect of (6), since the clutch actuators are disposed to stand up on the crankcase positioned on the bottom section of the region of the V-bank, in comparison with the case in which the clutch actuators are disposed to be laid down, an occupation area taken up by the clutch actuators can be reduced when seen in a plan view. For this reason, the clutch actuators can be easily accommodated within the region of the V-bank, and a degree of freedom when disposing the clutch actuator can be increased.

According to the above mentioned aspect of (7), as the plurality of clutch actuators are disposed parallel to any one of the pair of cylinders that constitute the V-bank, since the oil passages can be collectively provided, simplification of the oil passages can be achieved.

According to the above mentioned aspect of (8), since the internal combustion engine is a water-cooling engine and the pair of cylinders that constitute the V-bank are water-cooled, a thermal influence of the cylinders on the clutch actuators can be minimized.

DETAILED DESCRIPTION OF THE INVENTION

Hereinafter, embodiments of the present invention will be described on the basis of the accompanying drawings. Further, directions of forward, rearward, leftward, rightward, and the like described below are the same as directions in a vehicle described below unless the context clearly indicates otherwise. In addition, an arrow FR showing a forward direction with respect to a vehicle, an arrow LH showing a leftward direction with respect to the vehicle, and an arrow UP showing an upward direction with respect to the vehicle are provided on appropriate places used in the following description.

<First Embodiment>
<Entire Vehicle>

Figure 1:
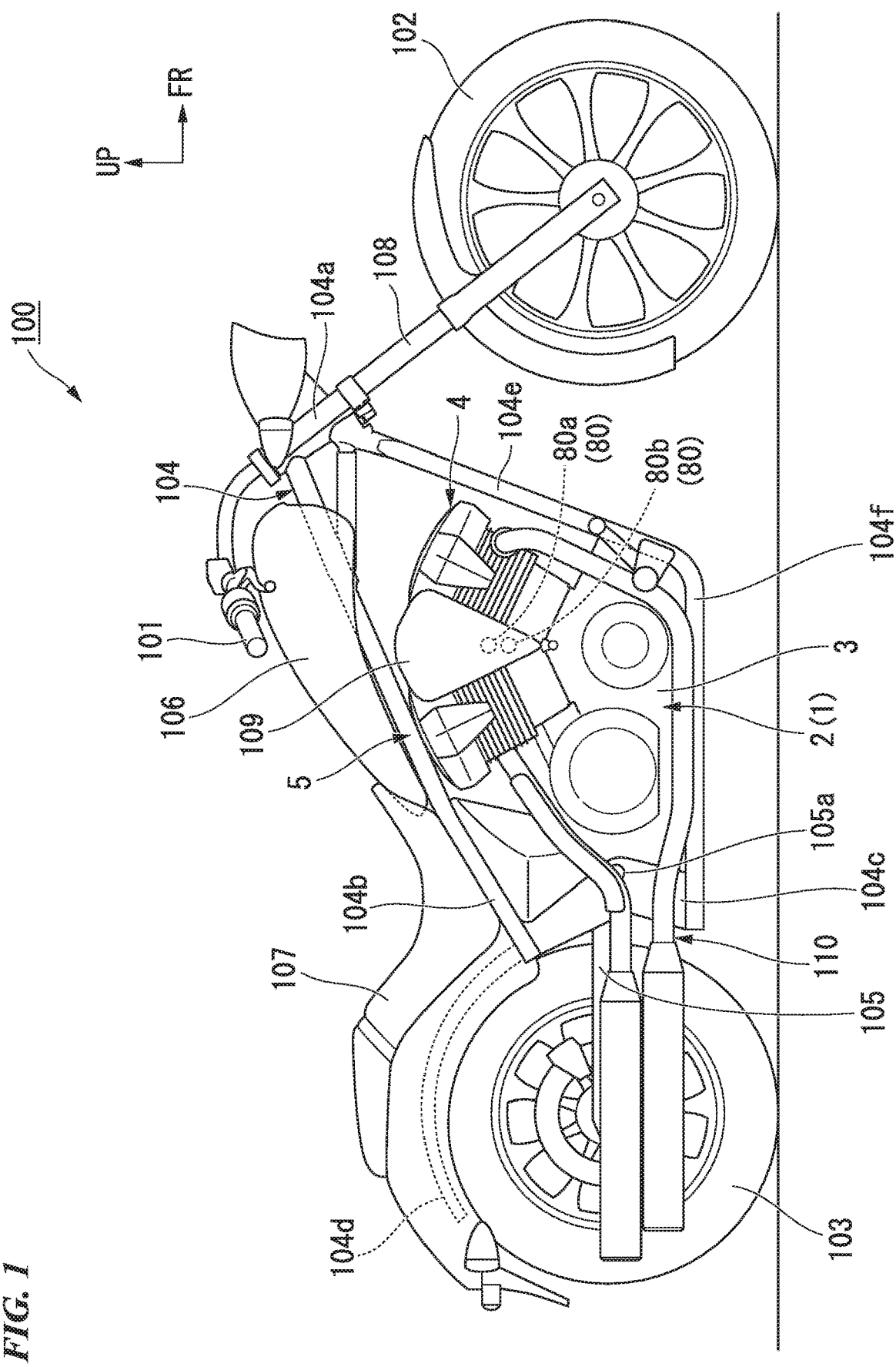
FIG. 1 is a right side view of a motorcycle according to a first embodiment of the present invention.

FIG. 1 shows a motorcycle 100 serving as an example of a saddle riding vehicle. The motorcycle 100 includes a front wheel 102 steered by a handle 101, and a rear wheel 103 driven by a power unit 1 including an engine 2.

Hereinafter, the motorcycle may be referred simply to as "a vehicle."

Steering system parts including the handle 101 and the front wheel 102 are steeringly supported by a head pipe 104a formed on a front end portion of a vehicle body frame 104. For example, the handle 101 is a bar handle fabricated by bending a metal handle pipe having a cylindrical shape. A handle steering shaft connected to the handle 101 is inserted through the head pipe 104a. The power unit 1 is disposed on a central section of the vehicle body frame 104 in a forward/rearward direction. A swing arm 105 is disposed at a rear side of the power unit 1. The swing arm 105 is supported on a rear lower section of the vehicle body frame 104 to be vertically swingably about a pivot shaft 105a.

For example, the vehicle body frame 104 is formed by integrally coupling a plurality of kinds of steel members through welding or the like. When seen in a side view of FIG. 1, the vehicle body frame 104 includes the head pipe 104a having a cylindrical shape and extending vertically and inclined so that the forward section thereof is disposed downward as it goes forward, a main frame 104b extending rearward and downward from an upper section of the head pipe 104a, a pair of left and right pivot frames 104c extending downward from a rear end portion of the main frame 104b, a pair of left and right rear frames 104d extending rearward from the rear end portion of the main frame 104b, a pair of left and right down frames 104e extending rearward and downward from a lower section of the head pipe 104a below a lower side of the main frame 104b, and a pair of left and right lower frames 104f extending rearward from lower ends of the down frames 104e and being coupled to lower ends of the pivot frames 104c.

A fuel tank 106 is attached to the main frame 104b. A seat 107 is installed behind the fuel tank 106 and above the left and right rear frames 104d. Further, in FIG. 1, reference numeral 108 designates a pair of left and right front forks disposed on left and right sides of the front wheel 102, reference numeral 109 designates an intake apparatus including a fuel supply apparatus for supplying an air-fuel mixture to a forward-inclined cylinder 4 and a rearward-inclined cylinder 5, and reference numeral 110 designates an exhaust apparatus that constitutes an exhaust system of the engine 2.

<Entire Power Unit>

Figure 2:
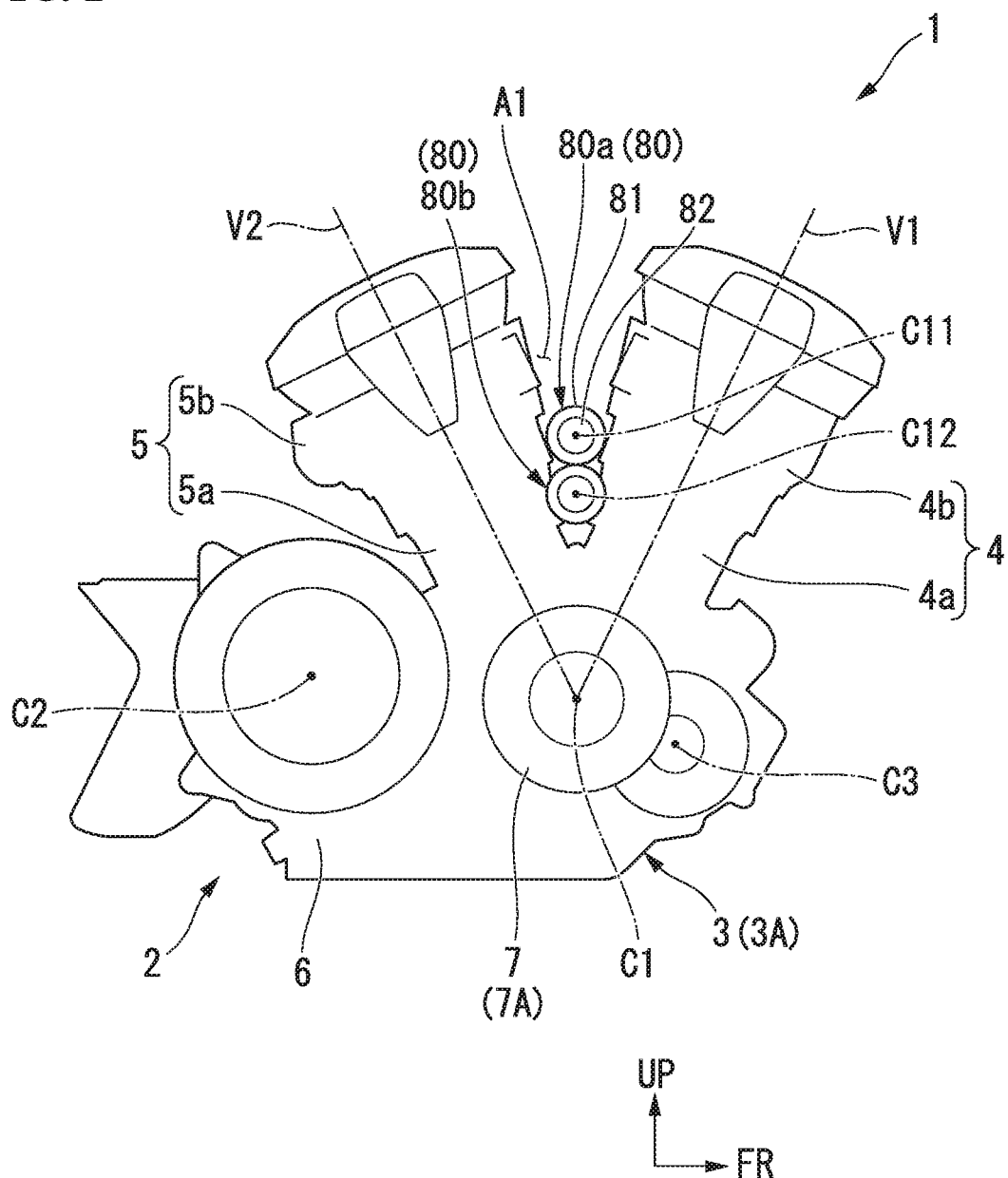
FIG. 2 is a right side view of an engine of the motorcycle according to the first embodiment of the present invention.

FIG. 2 shows the power unit 1 including a (so-called narrow-angle V type) engine 2 (an internal combustion engine) having a relatively small angle formed in a V type bank, as an example of a power unit for a vehicle.

As shown in FIG. 2, the engine 2 is a V type two-cylinder engine in which a rotational center axis C1 (hereinafter, also referred to as "a crank axis C1") of a crankshaft 21 (see FIG. 3) is provided in a vehicle width direction (a leftward/rightward direction). The forward-inclined cylinder 4 standing up on a diagonally upward and forward side and the rearward-inclined cylinder 5 standing up on a diagonally upward and rearward side are installed to stand up on a crankcase 3 of the engine 2. Cylinders 15 and 16 include cylinder blocks 4a and 5a installed integrally with the crankcase 3, and cylinder heads 4b and 5b attached onto the cylinder blocks 4a and 5a.

When seen in a side view of FIG. 2, an angle (hereinafter, also referred to as "a V bank angle") formed between an axis V1 (hereinafter, also referred to as "a forward-inclined cylinder axis V1") of the forward-inclined cylinder 4 and an axis V2 (hereinafter, also referred to as "a rearward-inclined cylinder axis V2") of the rearward-inclined cylinder 5 is about 52 degrees. The engine 2 of the first embodiment has a V bank angle that is smaller than that of an engine 202 (see FIG. 9) of a second embodiment. Further, the V bank angle may be set within a range of 10 degrees or more and 60 degrees or less.

Figure 3:
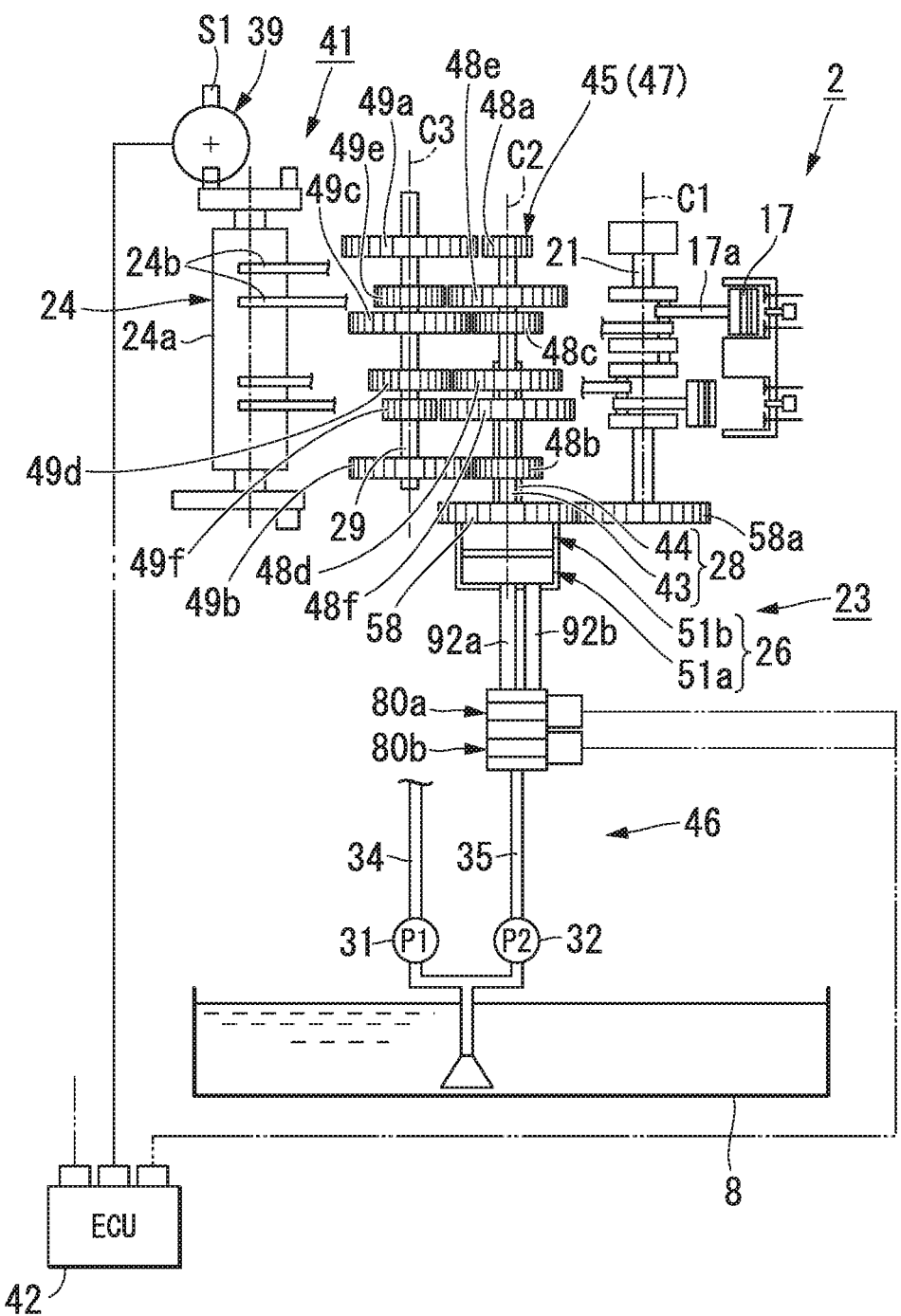
FIG. 3 is a schematic configuration view of a twin clutch type transmission of the engine.

Pistons 17 (see FIG. 3) are fitted into the cylinder blocks 4a and 5a, respectively. As shown in FIG. 3, reciprocal movement of each of the pistons 17 is converted into rotational movement of the crankshaft 21 via a connecting rod 17a. For example, a rotation driving force of the crankshaft 21 is input from a primary drive gear 58a of a right end portion of the crankshaft 21 to a twin clutch type transmission 23 on a rear side, and then, transmitted from a left side of a rear section of the crankcase 3 (see FIG. 2) to the rear wheel 103 (see FIG. 1) via a chain drive type power transmission mechanism (not shown). Further, while the embodiment is a V type two-cylinder engine, for the convenience of illustration, FIG. 3 shows a configuration of a V type four-cylinder engine.

As shown in FIG. 2, the engine 2 has a configuration in which a transmission gear portion is integrally provided. A rear section of the crankcase 3 of the engine 2 constitutes a transmission case 6 configured to accommodate the twin clutch type transmission 23 (see FIG. 3) and a change mechanism 24 (see FIG. 3) configured to change a transmission gear stage of the twin clutch type transmission 23. That is, the cylinder blocks 4a and 5a and the transmission case 6 are formed integrally with the crankcase 3.

A clutch cover 7 protruding rightward from a right side surface of the crankcase 3 is attached to the crankcase 3. An oil pan 8 (see FIG. 3) protruding downward from a lower surface of a crankcase is attached to the crankcase 3. Hereinafter, an assembly of the crankcase 3, the clutch cover 7, the oil pan 8, and so on, becomes an engine case 3A.

Figure 4:
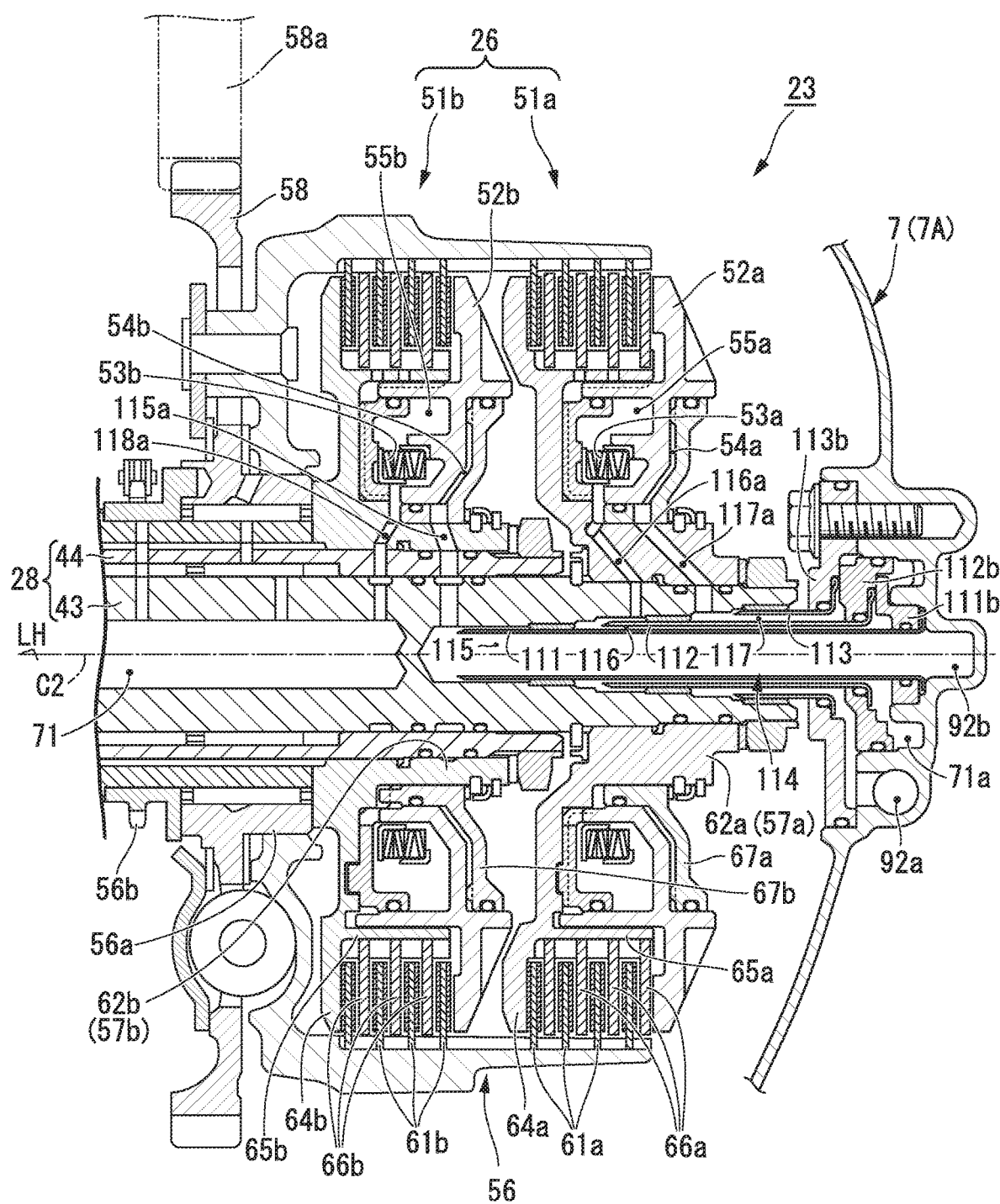
FIG. 4 is a cross-sectional view of the twin clutch type transmission.

As shown in FIG. 4, a twin clutch 26 and the primary drive gear 58a of the twin clutch type transmission 23 protrude further rightward than a right side surface of the crankcase 3. The clutch cover 7 is installed to cover the twin clutch 26 and the primary drive gear 58a from a right side. The clutch cover 7 constitutes a clutch case 7A configured to accommodate the twin clutch 26 and the primary drive gear 58a together with a right portion of the crankcase 3.

Here, the engine 2 is configured such that main three axes, which are the crankshaft 21 (see FIG. 3), and a main shaft 28 and a counter shaft 29 (see FIG. 3) that are being parallel to the crankshaft 21 and being included in the twin clutch type transmission 23, are disposed in a triangular shape.

When seen in a side view of FIG. 2, the axis C2 of the main shaft 28 is disposed behind the crank axis C1. An axis C3 of the counter shaft 29 is disposed at a front lower side of the crank axis C1.

<Automatic Transmission System>

As shown in FIG. 3, the motorcycle is provided with an automatic transmission system including the twin clutch type transmission 23 (a clutch apparatus) continuously connected to the engine 2, a gear shift apparatus 41 (a transmission device) having a drive mechanism 39 installed on the change mechanism 24, and a control unit (an electronic control unit (ECU)) 42 configured to control operations of the twin clutch type transmission 23 and the gear shift apparatus 41.

The twin clutch type transmission 23 includes the main shaft 28 of a dual structure including inner and outer shafts 43 and 44, the counter shaft 29 disposed parallel to the main shaft 28, a transmission gear group 45 disposed to bridge the main shaft 28 and the counter shaft 29, the twin clutch 26 disposed coaxially with a right end portion of the main shaft 28, and a hydraulic pressure supply apparatus 46 configured to supply a hydraulic pressure for operating the twin clutch 26. Hereinafter, an assembly including the main shaft 28, the counter shaft 29 and the transmission gear group 45 is set as a transmission 47.

The main shaft 28 is configured by relatively rotatably inserting a right portion of the inner shaft 43 through the outer shaft 44 that is relatively short. Drive gears 48a to 48f of six speed ranges in the transmission gear group 45 are disposed at outer circumferences of the inner and outer shafts 43 and 44. Meanwhile, driven gears 49a to 49f of six speed ranges in the transmission gear group 45 are disposed on an outer circumference of the counter shaft 29. Each of the drive gears 48a to 48f and the driven gears 49a to 49f are meshed with each other at the respective transmission gear stages, and constitute transmission gear pairs corresponding to the transmission gear stages, respectively.

The twin clutch 26 includes first and second hydraulic pressure type disk clutches (hereinafter, simply referred to as "clutches") 51a and 51b coaxially disposed to be adjacent to each other. The inner and outer shafts 43 and 44 are coaxially connected to the clutches 51a and 51b, respectively. A primary driven gear 58 meshed with the primary drive gear 58a of the crankshaft 21 is coaxially connected to a clutch outer 56 (see FIG. 4) shared by the clutches 51a and 51b. Accordingly, a rotation driving force of the crankshaft 21 is input to each of the clutches 51a and 51b via the gears 58 and 58a. Power transmission in each of the clutches 51a and 51b is individually intermittently performed according to whether a hydraulic pressure is supplied from the hydraulic pressure supply apparatus 46.

The hydraulic pressure supply apparatus 46 includes first and second oil pumps 31 and 32 coaxially disposed inside the lower section of the crankcase 3, a main feeding oil passage 34 extending from a discharge port of the first oil pump 31, a feeding oil passage 35 extending from a discharge port of the second oil pump 32, first and second clutch actuators 80a and 80b to which a downstream side of the feeding oil passage 35 is connected, and first and second supply oil passages 92a and 92b extending from each of the clutch actuators 80a and 80b to connection-side hydraulic pressure chambers 54a and 54b (see FIG. 4) of each of the clutches 51a and 51b.

The first oil pump 31 is provided to pump oil to the parts in the engine 2. The discharge port of the first oil pump 31 is connected to a main oil gallery (not shown) via the main feeding oil passage 34.

Meanwhile, the second oil pump 32 is a hydraulic pressure generating source for an operation of the twin clutch 26. The discharge port of the second oil pump 32 is connected to the feeding oil passage 35 of the twin clutch 26.

The feeding oil passage 35 and the first or second supply oil passage 92a or 92b can individually be made communicating with each other by operations of the clutch actuators 80a and 80b.

For example, when the feeding oil passage 35 and the first supply oil passage 92a communicate with each other, a relatively high hydraulic pressure from the second oil pump 32 is supplied to the connection-side hydraulic pressure chamber 54a of the first clutch 51a via the first supply oil passage 92a, and the first clutch 51a is switched from a disconnected state to a connected state.

Meanwhile, when the feeding oil passage 35 and the second supply oil passage 92b communicate with each other, a hydraulic pressure from the second oil pump 32 is supplied to the connection-side hydraulic pressure chamber 54b of the second clutch 51b via the second supply oil passage 92b, and the second clutch 51b is switched from a disconnected to a connected state.

The change mechanism 24 moves a plurality of shift forks 24b according to rotation of a shift drum 24a disposed parallel to the shafts 28 and 29, and changes the transmission gear pairs used in power transmission to the counter shaft 29. The drive mechanism 39 is disposed on a left end portion of the shift drum 24a. Further, reference numeral S1 in the drawing designates a sensor configured to detect an operation amount of the drive mechanism 39 used for detection of a transmission gear stage of the transmission 47.

A control unit 42 changes a transmission gear stage (a shift position) of the transmission 47 by controlling operations of the twin clutch type transmission 23 and the gear shift apparatus 41 on the basis of information or the like from various sensors.

For example, the control unit 42 connects one of the clutches 51a and 51b and disconnects the other clutch, and performs power transmission using any one transmission gear pair connected to one of the inner and outer shafts 43 and 44. The control unit 42 previously selects one that is used next from the transmission gear pairs connected to the other shaft of the inner and outer shafts 43 and 44, and disconnects one of the clutches 51a and 51b and connects the other clutch from this state. Accordingly, the transmission is switched to power transmission using the previously selected transmission gear pair, and the transmission 47 is shifted up or shifted down.

The transmission 47 is configured as a normally meshed type in which the drive gears 48a to 48f and the driven gears 49a to 49f corresponding to each of the transmission gear stages are normally meshed with each other. The gears are generally classified into free gears that are relatively rotatable with respect to the shaft, and slide gears that are spline-fitted to the shaft to be not relatively rotatable. The change mechanism 24 enables power transmission using the transmission gear pair corresponding to any transmission gear stage by appropriately sliding an arbitrary slide gear.

<Twin Clutch>

As shown in FIG. 4, the twin clutch 26 is disposed in the clutch case 7A.

In the clutch case 7A, the first clutch 51a for an odd number gear is disposed on a right side, and the second clutch 51b for an even number gear is disposed on a left side. That is, the first clutch 51a is disposed at an outer side of the engine case 3A (see FIG. 2) compared to the second clutch 51b, and the second clutch 51b is disposed at an inner side of the engine case 3A compared to the first clutch 51a. Each of the clutches 51a and 51b is a wet multi-plate clutch having a plurality of clutch plates overlapping each other in an axial direction thereof.

Each of the clutches 51a and 51b is of a hydraulic pressure type in which pressure plates 52a and 52b are displaced in the axial direction by a hydraulic pressure supplied from the outside to provide a predetermined engaging force. Each of the clutches 51a and 51b include return springs 53a and 53b configured to bias the pressure plates 52a and 52b to a clutch disconnection-side, the connection-side hydraulic pressure chambers 54a and 54b configured to apply a pressing force toward a clutch connection side to the pressure plates 52a and 52b, and disconnection-side hydraulic pressure chambers 55a and 55b configured to apply a pressing force toward a clutch disconnection-side to the pressure plates 52a and 52b, respectively.

A hydraulic pressure from the first oil pump 31 (see FIG. 3) is normally applied to the disconnection-side hydraulic pressure chambers 55a and 55b in a relatively low pressure state. Meanwhile, a relatively high hydraulic pressure from the second oil pump 32 (see FIG. 3) is capable of being supplied to the connection-side hydraulic pressure chambers 54a and 54b.

Each of the clutches 51a and 51b is configured to have substantially the same diameter while sharing a single clutch outer 56. The clutch outer 56 is formed in a bottomed cylindrical shape with a right side opening.

A clutch center 57a for the first clutch 51a is disposed on the right side in the clutch outer 56. The clutch center 57a is supported on a right end portion of the inner shaft 43 to be not relatively rotatable.

Meanwhile, a clutch center 57b for the second clutch 51b is disposed on a left side in the clutch outer 56. The clutch center 57b is supported on a right end portion of the outer shaft 44 to be not relatively rotatable.

The primary driven gear 58 with which the primary drive gear 58a of the crankshaft 21 is meshed is connected to a bottom section of the clutch outer 56 on the left side via a spring damper. The clutch outer 56 is driven from the primary driven gear 58 via a spring damper. A drive sprocket 56b for driving the oil pumps 31 and 32 is rotatably installed integrally with a hub section 56a of the clutch outer 56.

A plurality of clutch plates 61a for the first clutch 51a is supported on a right side of an inner circumference of an outer wall section of the clutch outer 56 to be not relatively rotatable. Meanwhile, a plurality of clutch plates 61b for the second clutch 51b is supported on a left side of an inner circumference of an outer wall section of the clutch outer 56 to be not relatively rotatable.

An inner wall section 65a protrudes from a flange section 64a disposed on a left side of the clutch center 57a of the first clutch 51a. A plurality of clutch disks 66a is supported on an outer circumference of the inner wall section 65a to be not relatively rotatable. The clutch disks 66a and the clutch plates 61a are disposed to overlap each other in a clutch axial direction.

The pressure plate 52a is disposed to face a right side of the flange section 64a.

The clutch plates 61a and the clutch disks 66a are disposed between an outer circumferential side of the pressure plate 52a and an outer circumferential side of the flange section 64a in a stacked state.

The disconnection-side hydraulic pressure chamber 55a is formed between an inner circumferential side of the pressure plate 52a and an inner circumferential side of the flange section 64a, and the return spring 53a configured to bias the pressure plate 52a rightward (toward a side separated from the flange section 64a, a clutch disconnection-side) is disposed therebetween.

A support flange section 67a formed integrally with an outer circumference of a central cylindrical section 62a disposed at a right side of the clutch center 57a is disposed to face a right side of an inner circumferential side of the pressure plate 52a. The connection-side hydraulic pressure chamber 54a is formed between the support flange section 67a and the inner circumferential side of the pressure plate 52a.

Meanwhile, the inner wall section 65b protrudes from a flange section 64b disposed on a left side of the clutch center 57b of the second clutch 51b. A plurality of clutch disks 66b is supported on an outer circumference of an inner wall section 65b to be not relatively rotatable. The clutch disks 66b and the clutch plates 61b are disposed to overlap each other in the clutch axial direction.

The pressure plate 52b is disposed to face a right side of the flange section 64b.

The clutch plates 61b and the clutch disks 66b are disposed between the outer circumferential side of the pressure plate 52b and the outer circumferential side of the flange section 64b in a stacked state.

The disconnection-side hydraulic pressure chamber 55b is formed between the inner circumferential side of the pressure plate 52b and the inner circumferential side of the flange section 64b, and the return spring 53b configured to bias the pressure plate 52b rightward (a side separated from the flange section 64b, a clutch disconnection-side) is disposed therebetween.

A support flange section 67b formed integrally with an outer circumference of a central cylindrical section 62b disposed on a right side of the clutch center 57b is disposed to face a right side of the inner circumferential side of the pressure plate 52b. The connection-side hydraulic pressure chamber 54b is formed between the support flange section 67b and the inner circumferential side of the pressure plate 52b.

In the clutches 51a and 51b, in an engine stop state (a stop state of the oil pumps 31 and 32), the pressure plates 52a and 52b are displaced rightward by biasing forces of the return springs 53a and 53b, and are in a clutch disconnection state in which frictional engagement between the clutch plates 61a and 61b and the clutch disks 66a and 66b is released. In the clutches 51a and 51b, in a state in which support of the hydraulic pressure supply from the hydraulic pressure supply apparatus 46 is stopped even in an engine operating state, biasing forces of the return springs 53a and 53b and hydraulic pressures of the disconnection-side hydraulic pressure chambers 55a and 55b are applied to the pressure plates 52a and 52b, and similarly, a clutch disconnection state is provided.

Meanwhile, in the first clutch 51a, in an engine operating state and a state in which a relatively high hydraulic pressure is supplied from the hydraulic pressure supply apparatus 46 to the connection-side hydraulic pressure chamber 54a, as the pressure plate 52a is displaced leftward (the flange section 64a side, a clutch connection side) against the hydraulic pressure of the disconnection-side hydraulic pressure chamber 55a and the biasing force of the return spring 53a, and the clutch plates 61a and the clutch disks 66a are compressed and frictionally engaged, the first clutch 51a is brought into a clutch connection state in which torque transmission between the clutch outer 56 and the clutch center 57a becomes possible.

Similarly, in the second clutch 51b, in an engine operating state and a state in which a relatively high hydraulic pressure is supplied from the hydraulic pressure supply apparatus 46 to the connection-side hydraulic pressure chamber 54b, as the pressure plate 52b is displaced leftward (the flange section 64b side, a clutch connection side) against the hydraulic pressure of the disconnection-side hydraulic pressure chamber 55b and the biasing force of the return spring 53b, and the clutch plates 61b and the clutch disks 66b are compressed and frictionally engaged, the second clutch 51b is brought into a clutch connection state in which torque transmission between the clutch outer 56 and the clutch center 57b becomes possible.

Further, when supply of the hydraulic pressure from the clutch connection state of the clutches 51a and 51b to the connection-side hydraulic pressure chambers 54a and 54b is stopped, the pressure plates 52a and 52b are displaced rightward by the hydraulic pressure of the disconnection-side hydraulic pressure chambers 55a and 55b and the biasing force of the return springs 53a and 53b, and frictional engagement between the clutch plates 61a and 61b and the clutch disks 66a and 66b is released to provide the clutch disconnection state in which torque transmission between the clutch outer 56 and the clutch centers 57a and 57b becomes impossible.

The first, second and third pipes 111, 112 and 113 that bridge the clutch cover 7 and the right end portion of the main shaft 28 (the inner shaft 43) are disposed inside the clutch cover 7. The pipes 111, 112 and 113 are disposed coaxially with the main shaft 28. The pipes 111, 112 and 113 are disposed to overlap each other with predetermined gaps therebetween in a sequence of first, second and third from the inner circumferential side.

A right hollow section 114 having a diameter that increases rightward in substantially a three-stage way is formed in the right portion of the inner shaft 43. The right hollow section 114 is spaced apart from a main supply oil passage 71 from a left end opening in the inner shaft 43 to the vicinity of the second clutch 51b via a partition wall. Left side portions of the pipes 111, 112 and 113 are inserted into the right hollow section 114 from a right end opening thereof.

A left outer circumference of the first pipe 111 is held in an oil sealed manner at a left inner circumference of the right hollow section 114. A left outer circumference of the second pipe 112 is held in an oil sealed manner at an inner circumference of an intermediate section of the right hollow section 114. A left outer circumference of the third pipe 113 is held in an oil sealed manner at a right inner circumference of the right hollow section 114.

Right end portions of the pipes 111, 112 and 113 are inserted and held in the oil sealed manner inside annular holders 111b, 112b and 113b, respectively. The holders 111b, 112b and 113b are fixed to the outer sidewall of the clutch cover 7 at inside the case in a state in which the right end portions of the pipes 111, 112 and 113 are held.

A space in the first pipe 111 and an annular shape formed between the pipes 111, 112 and 113 constitute oil passages 115, 116 and 117 in a plurality of shafts overlapping coaxially in the main shaft 28.

Specifically, the space in the first pipe 111 (hereinafter, also referred to as "a first space") functions as the oil passage 115 in the first shaft. A right end side of the first space communicates with the second supply oil passage 92b formed in the clutch cover 7. A left end side of the first space communicates with the connection-side hydraulic pressure chamber 54b of the second clutch 51b via the connection-side oil passage 115a passing through the inner and outer shafts 43 and 44 and the clutch center 57b.

A space between the first pipe 111 and the second pipe 112 (hereinafter, also referred to as "a second space") functions as the oil passage 116 in the second shaft. A right end side of the second space communicates with the main supply oil passage 71a in the cover formed in the clutch cover 7. A left end side of the second space communicates with the disconnection-side hydraulic pressure chamber 55a of the first clutch 51a via the disconnection-side oil passage 116a passing through the inner shaft 43 and the clutch center 57a.

A space between the second pipe 112 and the third pipe 113 (hereinafter, also referred to as "a third space") functions as the oil passage 117 in the third shaft. A right end side of the third space communicates with the first supply oil passage 92a formed in the clutch cover 7. A left end side of the third space communicates with the connection-side hydraulic pressure chamber 54a of the first clutch 51a via the connection-side oil passage 117a passing through the inner shaft 43 and the clutch center 57a.

A right end portion of the main supply oil passage 71 in the inner shaft 43 communicates the disconnection-side hydraulic pressure chamber 55b of the second clutch 51b via a disconnection-side oil passage 118a passing through the inner and outer shafts 43 and 44 and the clutch center 57b. A hydraulic pressure from the first oil pump 31 (see FIG. 3) is supplied to the disconnection-side hydraulic pressure chamber 55b of the second clutch 51b via the main supply oil passage 71 and the disconnection-side oil passage 118a in a relatively low pressure state. In addition, a hydraulic pressure from the first oil pump 31 (see FIG. 3) is supplied to the disconnection-side hydraulic pressure chamber 55a of the first clutch 51a via the main supply oil passage 71a in the cover and the oil passage 116 and the disconnection-side oil passage 116a in the second shaft in a relatively low pressure state.

Then, when the feeding oil passage 35 and the first supply oil passage 92a come in communication with each other due to an operation of the first clutch actuator 80a, a hydraulic pressure from the second oil pump 32 (see FIG. 3) is supplied to the connection-side hydraulic pressure chamber 54a of the first clutch 51a via the first supply oil passage 92a, and the oil passage 117 and the connection-side oil passage 117a in the third shaft in a relatively high pressure state.

In addition, when the feeding oil passage 35 and the second supply oil passage 92b come in communication with each other due to an operation of the second clutch actuator 80b, a hydraulic pressure from the second oil pump 32 (see FIG. 3) is supplied to the connection-side hydraulic pressure chamber 54b of the second clutch 51b via the second supply oil passage 92b, and the oil passage 115 and the connection-side oil passage 115a in the first shaft in a relatively high pressure state.

<Clutch Actuator>

As shown in FIG. 2, each of the clutch actuators 80a and 80b (hereinafter, also referred to as "a clutch actuator 80") includes a columnar electromagnetic coil section 81, and a columnar valve body section 82 having a diameter smaller than that of the electromagnetic coil section 81. The electromagnetic coil section 81 is substantially coaxially connected to one end side of the valve body section 82. For example, the valve body section 82 includes a cylinder (not shown) to which the feeding oil passage 35 and the first or second supply oil passage 92a or 92b (see FIG. 3) are connected, and a piston (not shown) operated in the cylinder to switch communication states of the oil passages 35, 92a and 92b.

The electromagnetic coil section 81 controls an operation of the piston of the valve body section 82. For example, the electromagnetic coil section 81 is a linear solenoid. The electromagnetic coil section 81 is driven and controlled by the control unit 42 (see FIG. 3).

When seen in a side view of FIG. 2, the clutch actuators 80a and 80b are installed on the cylinders 4 and 5 so that the clutch actuators 80a and 80b enter a region A1 of a V-bank. When seen in a side view of FIG. 2, the clutch actuators 80a and 80b are installed on the cylinders 4 and 5 so that the clutch actuators 80a and 80b overlap with a region A1 of a V-bank. When seen in the side view of FIG. 2, the clutch actuators 80a and 80b are disposed parallel to each other in the vertical direction while the axes C11 and C12 are arranged in the vehicle width direction. The clutch actuators 80a and 80b are sandwiched and fixed between the pair of cylinders 4 and 5. The first clutch actuator 80a is fixed to the upper section of the second clutch actuator 80b. Further, referring to FIG. 1, the clutch actuators 80a and 80b are covered by the intake apparatus 109 and considered not to be exposed. Further, the clutch actuators 80a and 80b may be disposed with the top and bottom exchanged.

Figure 5:
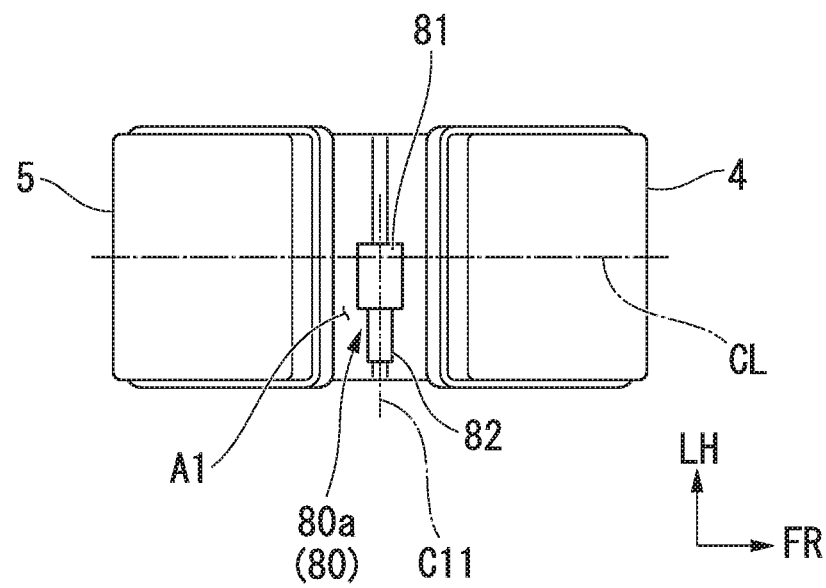
FIG. 5 is a plan view showing disposition of a clutch actuator according to the first embodiment.

When seen in a plan view of FIG. 5, both of the clutch actuators 80a and 80b (in FIG. 5, only the first clutch actuator 80a is shown) are contained within a width of the pair of cylinders 4 and 5 that constitute the V-bank. In other words, when seen in a plan view of FIG. 5, both of the clutch actuators 80a and 80b overlap with the region A1 of the V-bank. When seen in a plan view of FIG. 5, the two clutch actuators 80a and 80b are disposed to overlap each other.

When seen in a plan view of FIG. 5, the clutch actuators 80a and 80b are disposed adjacent to a right side in the width of the pair of cylinders 4 and 5. The clutch actuators 80a and 80b are disposed such that the valve body section 82 is disposed on the right side. Reference numeral CL in the drawings designates a centerline of the pair of cylinders 4 and 5 in a width direction (hereinafter, also referred to as "a cylinder width direction centerline").

For example, the feeding oil passage 35 (see FIG. 3) extends upward substantially vertically from a discharge port of the second oil pump 32 inside a lower section of the crankcase 3 and reaches the clutch actuators 80a and 80b. That is, the clutch actuators 80a and 80b are disposed almost directly above the second oil pump 32 when seen in the side view of the engine. Accordingly, a length of the feeding oil passage 35 is minimized to a minimum level, and simplification and reduction in size of a hydraulic pressure path are achieved. In addition, in the clutch actuators 80a and 80b, since the length of the feeding oil passage 35 drawn to a right portion of the crankcase 3 can be reduce as much as possible as the valve body section 82 is disposed to be positioned on the right side, it is preferable that reduction in length of the hydraulic pressure path is achieved.

As described above, in the embodiment, in the power unit for a vehicle including the engine 2 serving as a power source, the gear shift apparatus 41, the twin clutch type transmission 23 configured to intermittently switch power transmission between the engine 2 and the gear shift apparatus 41, and the clutch actuator 80 configured to control intermittent switching of the twin clutch type transmission 23, the engine 2 includes the crankcase 3, and the pair of cylinders 4 and 5 installed on the crankcase 3 such that the V-bank is formed therebetween, and when seen in a plan view, the clutch actuator 80 is installed on the cylinders 4 and 5 so as to overlap with the region A1 of the V-bank.

According to the configuration, as the clutch actuator 80 is installed on the cylinders 4 and 5 such that the clutch actuator 80 overlaps with the region A1 of the V-bank when seen in a plan view, since the clutch actuator 80 can be minimized from largely expanding toward a side of the crankcase 3, the clutch actuator 80 can be protected. In addition, since the clutch actuator 80 can be made inconspicuous, exterior design properties can be improved. Accordingly, protection of the clutch actuator 80 and improvement of the exterior design property are compatible.

In particular, since the plurality of clutch actuators 80 are installed on the case of the twin clutch 26, this is preferable for obtaining compatibility between protection of the clutch actuator 80 and improvement of the exterior design property.

In addition, in the embodiment, as the entire clutch actuator 80 is accommodated within the width of the pair of cylinders 4 and 5 that constitute the V-bank, since the clutch actuator 80 does not expand outside of the width of the pair of cylinders 4 and 5, the clutch actuator 80 can be sufficiently protected by the pair of cylinders 4 and 5.

In addition, in the embodiment, as the two clutch actuators 80 are installed and the two clutch actuators 80 are disposed to overlap each other when seen in a plan view, in comparison with the case in which the two clutch actuators 80 are separated from each other when seen in a plan view, an occupation area taken up by the two clutch actuators 80 when seen in a plan view can be reduced. For this reason, the two clutch actuators 80 can be easily accommodated within the region A1 of the V-bank, and a degree of freedom when disposing the two clutch actuators can be increased. In particular, since the two clutch actuators 80 cannot be easily accommodated within the region A1 of the V-bank when an angle of the V-bank is relatively small (in the case of a so-called narrow angle V type), this is preferable for obtaining compatibility between protection of the clutch actuator 80 and improvement of the exterior design property. In addition, in the present embodiment, since the two clutch actuators 80 are disposed so as to entirely overlap with each other when seen in a plan view, this is preferable for obtaining compatibility between protection of the clutch actuator 80 and improvement of the exterior design property.

Further, in the embodiment, the engine 2 may be a water-cooling engine. According to the configuration, since the pair of cylinders 4 and 5 that constitute the V-bank are of a water-cooling type, a thermal influence of the cylinders 4 and 5 on the clutch actuator 80 can be minimized.

<Variant Example of First Embodiment>

Next, a variant example of the first embodiment will be described. Further, in the following variant example, portions the same as in the first embodiment are designated by the same reference numerals and description thereof will be omitted.

<First Variant Example of First Embodiment>

Figure 6:
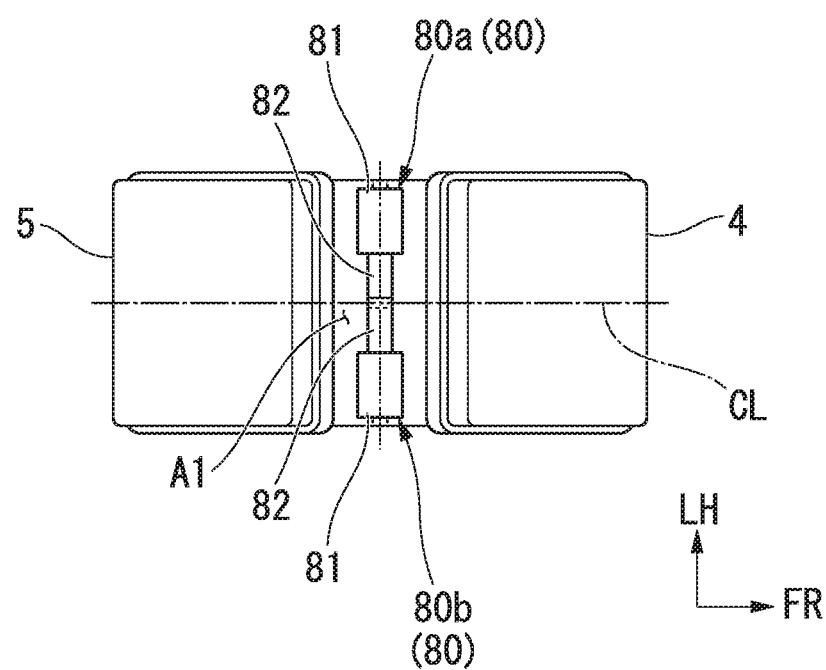
FIG. 6 is a plan view showing disposition of a clutch actuator according to a first variant example of the first embodiment.

While an example in which the two clutch actuators 80 are disposed to overlap each other entirely when seen in a plan view has been exemplarily described in the first embodiment, there is no limitation thereto. For example, as shown in FIG. 6, the two clutch actuators 80 may be disposed to overlap each other partially when seen in a plan view. When seen in a plan view of FIG. 6, the clutch actuators 80*a* and 80*b* are disposed to be allocated to left and right sides in the width of the pair of cylinders 4 and 5.

The clutch actuators 80*a* and 80*b* are disposed such that the valve body section 82 is positioned on a center in the vehicle width direction. When seen in a plan view of FIG. 6, the clutch actuators 80*a* and 80*b* are disposed such that one end portions of the valve body sections 82 overlap each other. The clutch actuators 80*a* and 80*b* are disposed such that the valve body sections 82 are close to each other.

The second clutch actuator 80*b* is disposed under the first clutch actuator 80*a*. Further, the second clutch actuator 80*b* may be disposed over the first clutch actuator 80*a*.

According to the variant example, since the clutch actuator 80 includes the electromagnetic coil section 81 and the valve body section 82 having a diameter smaller than that of the electromagnetic coil section 81 and the two clutch actuators 80 are disposed such that the valve body sections 82 are close to each other, in comparison with the case in which the two clutch actuators 80 are disposed such that the electromagnetic coil sections 81 are close to each other, an occupation area taken up by the two clutch actuators 80 can be decreased. For this reason, the two clutch actuators 80 can be easily accommodated within the region A1 of the V-bank, and a degree of freedom when disposing the two clutch actuators 80 can be increased. In particular, since the two clutch actuators 80 cannot be easily accommodated within the region A1 of the V-bank when the angle of the V-bank is relatively small (in the case of a so-called narrow angle V type), this is preferable for obtaining compatibility between protection of the clutch actuator 80 and improvement of the exterior design property.

Further, the two clutch actuators 80 may be disposed on left and right sides to be adjacent to each other when seen in a plan view. According to the configuration, in comparison with the case in which the two clutch actuators 80 are disposed to be arranged on front and rear sides when seen in a plan view, since an overall forward/rearward width of the two clutch actuators 80 can be reduced, it is particularly preferable for the narrow angle V type.

<Second Variant Example of First Embodiment>

Figure 7:
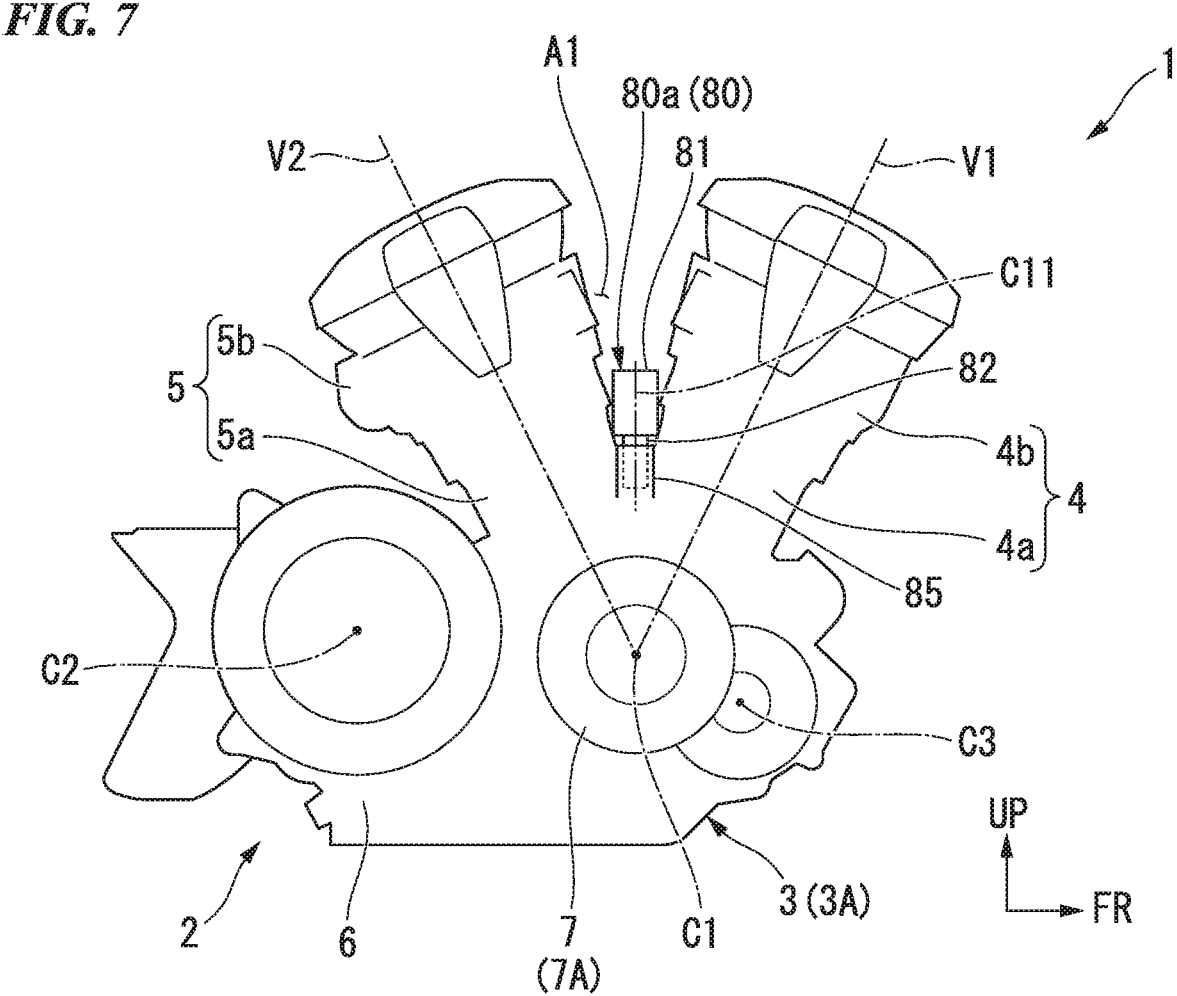
FIG. 7 is a right side view showing disposition of a clutch actuator according to a second variant example of the first embodiment.
Figure 8:
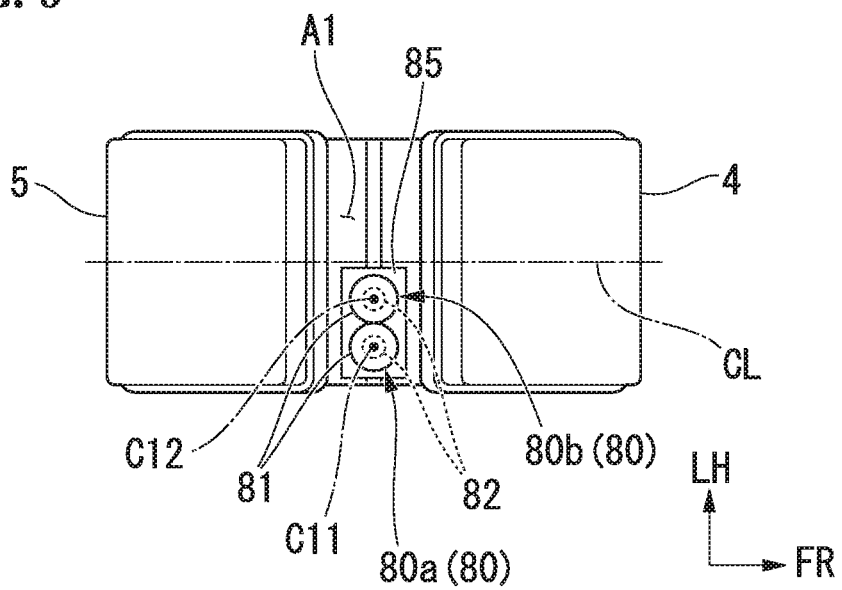
FIG. 8 is a plan view showing disposition of the clutch actuator according to the second variant example of the first embodiment.

While an example in which the clutch actuators 80*a* and 80*b* are disposed parallel to each other in the vertical direction while the axes C11 and C12 are arranged in the vehicle width direction has been exemplarily described in the first embodiment, there is no limitation thereto. For example, as shown in FIG. 7, the clutch actuators 80*a* and 80*b* (in FIG. 7, only the first clutch actuator 80*a* is shown) may be disposed such that the axes C11 and C12 (see FIG. 8) are arranged on left and right sides parallel to each other along the vertical direction. The clutch actuators 80*a* and 80*b* are disposed so as to stand up on the crankcase 3 positioned at the bottom section of the region A1 in between the V-bank. The clutch actuators 80*a* and 80*b* are disposed such that the valve body section 82 is disposed thereunder.

Specifically, the clutch actuators 80*a* and 80*b* are attached to an actuator installation section 85 of the upper section of the crankcase 3 disposed at the bottom section of the region A1 in between the V-bank.

The actuator installation section 85 protrudes upward from the bottom section of the region A1 in between the V-bank. Insertion holes into which the valve body sections 82 of the clutch actuators 80*a* and 80*b* can be inserted are formed in the actuator installation section 85. That is, the valve body sections 82 of the clutch actuators 80*a* and 80*b* are inserted and fixed into the insertion holes of the actuator installation section 85.

When seen in a side view of FIG. 7, the two clutch actuators 80*a* and 80*b* are disposed to overlap each other entirely. When seen in a plan view of FIG. 8, the clutch actuators 80*a* and 80*b* are disposed to be deviated toward a right side in the width of the pair of cylinders 4 and 5. Specifically, the clutch actuators 80*a* and 80*b* are disposed further rightward than a centerline CL in the cylinder width direction in the width of the pair of cylinders 4 and 5.

The second clutch actuator 80*b* is disposed on the left side of the first clutch actuator 80*a*. The second clutch actuator 80*b* is disposed closer to the centerline CL in the cylinder width direction than the first clutch actuator 80*a*. Further, the second clutch actuator 80*b* may be disposed on the right side of the first clutch actuator 80*a*.

According to the variant example, since the clutch actuator 80 is disposed to stand up on the crankcase 3 positioned on the bottom section of the region A1 in between the V-bank, in comparison with the case in which the clutch actuator 80 is disposed in a laid down manner, an occupation area taken up by the clutch actuator 80 when seen in a plan view can be reduced. For this reason, the clutch actuator 80 can be easily accommodated within the region A1 of the V-bank, and a degree of freedom when disposing the clutch actuator 80 can be increased. In particular, since the plurality of clutch actuators 80 cannot be easily accommodated within the region A1 of the V-bank when the angle of the V-bank is relatively small (in the case of a so-called narrow angle V type), this is preferable for obtaining compatibility between protection of the clutch actuator 80 and improvement of the exterior design property.

In addition, in the clutch actuators 80*a* and 80*b*, since the length of the feeding oil passage 35 drawn to the right portion of the crankcase 3 can be reduced as much as possible as the clutch actuators 80*a* and 80*b* are disposed to be deviated toward a right side in the width of the pair of cylinders 4 and 5, this is preferable for achieving a reduction in length of the hydraulic pressure path.

<Second Embodiment>

Next, a second embodiment of the present invention will be described. Further, in the following second embodiment, portions the same as in the first embodiment are designated by the same reference numerals and description thereof will be omitted.

<Entire Power Unit>

Figure 9:
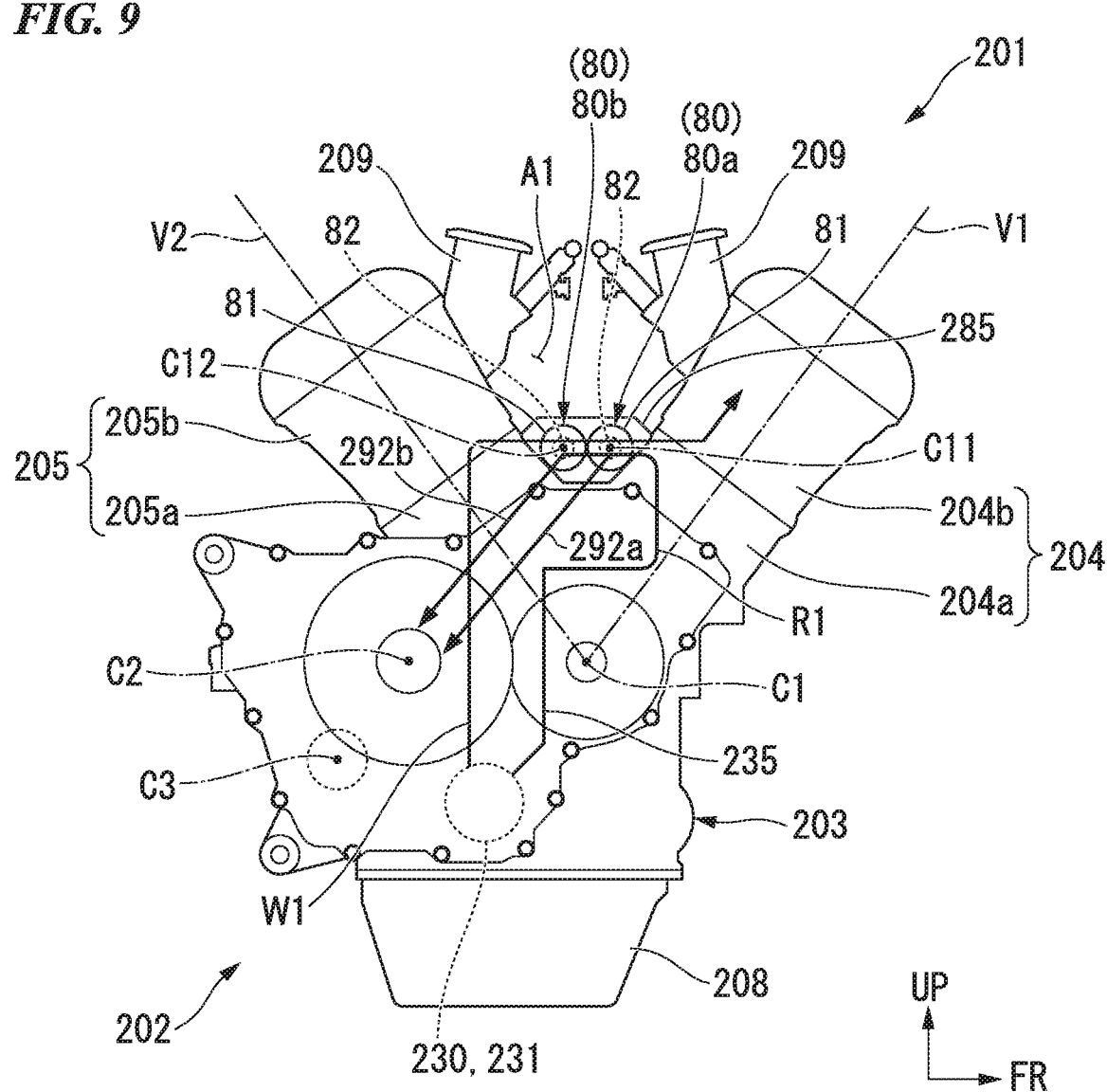
FIG. 9 is a right side view of an engine of a motorcycle according to a second embodiment of the present invention.

FIG. 9 shows a power unit 201 including an (so-called wide angle V type) engine having a relatively large angle of the V-bank as an example of the power unit for a vehicle.

As shown in FIG. 9, the engine 202 is a V type two-cylinder engine having a crank axis C1 in the vehicle width direction. A forward-inclined cylinder 204 standing up toward a diagonally upward and forward side and a rearward-inclined cylinder 205 standing up toward a diagonally upward and rearward side are vertically installed on a crankcase 203 of the engine 202. The cylinders 204 and 205 include cylinder blocks 204*a* and 205*a* installed integrally with the crankcase 203, and cylinder heads 204*b* and 205*b* attached onto the cylinder blocks 204*a* and 205*a*.

When seen in a side view of FIG. 9, an angle (hereinafter, also referred to as "a V bank angle") formed between an axis V1 of the forward-inclined cylinder 204 (hereinafter, also referred to as "a forward-inclined cylinder axis V1") and an axis V2 of the rearward-inclined cylinder 205 (hereinafter, also referred to as "a rearward-inclined cylinder axis V2") is about 74 degrees. Further, the V bank angle may be set within a range of more than 60 degrees and less than 180 degrees.

While not shown, pistons are fitted into the cylinder blocks 204*a* and 205*a*, respectively. Reciprocal movement of the pistons is converted into rotational movement of the crankshaft via a connecting rod. For example, a rotation driving force of the crankshaft is input to a twin clutch type transmission from a primary drive gear of a right end portion thereof, and then, transmitted to a rear wheel via a shaft drive type power transmission mechanism from a left side of a rear section of the crankcase 203.

Here, the engine 202 is configured such that main three axes, which are the crankshaft, and the main shaft and the counter shaft that are being parallel to the crankshaft and being included in the twin clutch type transmission, are disposed in a triangular shape. When seen in a side view of FIG. 9, the axis C2 of the main shaft is disposed behind the crank axis C1. The axis C3 of the counter shaft is disposed behind and below the axis C2 of the main shaft.

A water pump 230 and an oil pump 231 that are coaxial with each other are accommodated in a lower section of the crankcase 203. For example, the oil pump 231 is operated to rotate with the water pump 230. Further, reference numeral 208 in the drawing designates an oil pan, and reference numeral 209 in the drawing designates a throttle body.

<Disposition of Clutch Actuator>

As shown in FIG. 9, the clutch actuators 80*a* and 80*b* are installed on the cylinders 204 and 205 so as to overlap with the region A1 of the V-bank. When seen in a side view of FIG. 9, the clutch actuators 80*a* and 80*b* are disposed parallel in a front and rear direction with each other while the axes C11 and C12 are arranged in the vehicle width direction.

Specifically, the clutch actuators 80*a* and 80*b* are accommodated within an actuator accommodating section 285 disposed at the bottom section of the region A1 in between the V-bank. The actuator accommodating section 285 expands upward in the bottom section of the region A1 inserted in the V-bank. An internal space configured to accommodate entire of the both of the clutch actuators 80*a* and 80*b* is formed in the actuator accommodating section 285. That is, entire of the both of the clutch actuators 80*a* and 80*b* are accommodated in the internal space of the actuator accommodating section 285.

Figure 10:
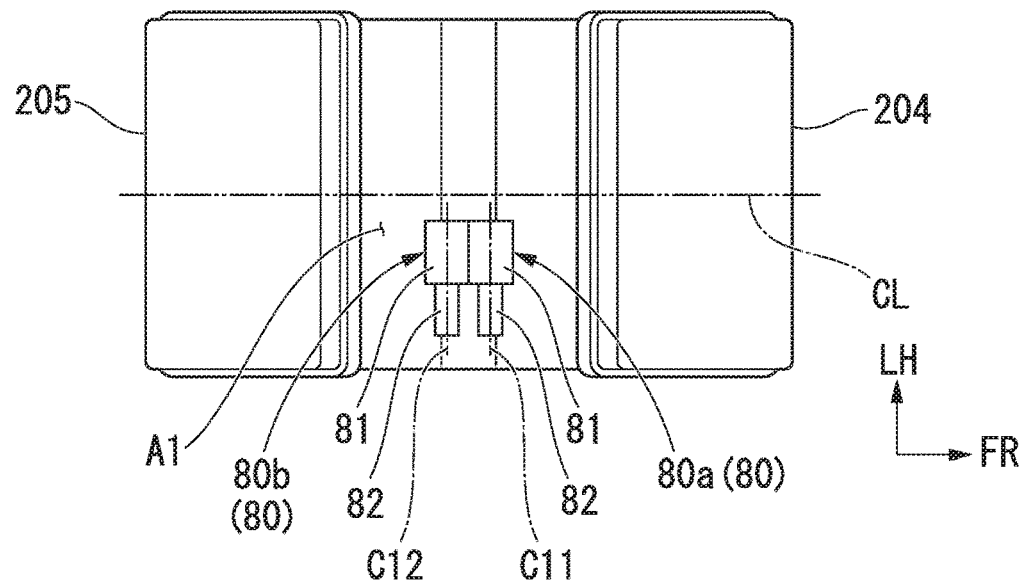
FIG. 10 is a plan view showing disposition of a clutch actuator according to the second embodiment.

When seen in a plan view of FIG. 10, both of the clutch actuators 80*a* and 80*b* are accommodated within the width of the pair of cylinders 204 and 205 that constitute the V-bank. In other words, when seen in a plan view of FIG. 10, both of the clutch actuators 80*a* and 80*b* are accommodated within the region A1 of the V-bank. The first clutch actuator 80*a* is disposed in front of the second clutch actuator 80*b*. Further, the clutch actuators 80*a* and 80*b* may be disposed with front and rear sides thereof interchanged. For the convenience of illustration, in FIG. 10, illustration of the actuator accommodating section 285 is omitted.

When seen in a plan view of FIG. 10, the two clutch actuators 80*a* and 80*b* are disposed side by side in front and rear direction so as to be adjacent with each other. The two clutch actuators 80*a* and 80*b* are disposed to overlap each other in the forward/rearward direction entirely.

When seen in a plan view of FIG. 10, the clutch actuators 80*a* and 80*b* are disposed to be deviated toward a right side in the width of the pair of cylinders 204 and 205. Specifically, the clutch actuators 80*a* and 80*b* are disposed further rightward than the centerline CL in the cylinder width direction in the width of the pair of cylinders 204 and 205. The clutch actuators 80*a* and 80*b* are disposed such that the valve body section 82 is disposed on the right side.

When seen in the side view of FIG. 9, a feeding oil passage 235 extends upward from the discharge port of the oil pump 231 of an inner side of a lower section of the crankcase 203, and then extends in a curved manner so as to bypass the crankshaft 21, and reaches the clutch actuators 80*a* and 80*b*. First and second supply oil passages 292*a* and 292*b* extend from the clutch actuators 80*a* and 80*b* toward the clutches (not shown) while being inclined rearward and downward. That is, an oil passage RI including the feeding oil passage 235 and the first and second supply oil passages 292a and 292b extends upward from the discharge port of the oil pump 231 and then extends toward the clutches (not shown) via the actuator accommodating section 285.

When seen in the side view of FIG. 9, a water passage W1 extends substantially vertically upward from the discharge port of the water pump 230 of the inner side of the lower section of the crankcase 203 and then extends to be curved forward, reaches the actuator accommodating section 285, and then, extends to be inclined forward and upward along an inclination of the forward-inclined cylinder 204. That is, the water passage W1 extends upward from the discharge port of the water pump 230 and then extends along the forward-inclined cylinder 204 via the actuator accommodating section 285.

In the embodiment, the engine 202 is a water-cooling engine. For example, a water jacket (not shown) is installed around the pair of cylinders 204 and 205. Accordingly, the pair of cylinders 204 and 205 that constitute the V-bank are water-cooled.

As described above, in the embodiment, since the two clutch actuators 80 are installed and the two clutch actuators 80 are disposed side by side in the front and rear direction so as to be adjacent with each other when seen in a plan view, in comparison with the case in which the two clutch actuators 80 are vertically disposed side by side when seen in the side view, since a vertical width of both of the two clutch actuators 80 can be reduced, a center of gravity of the power unit 201 can be minimized to a low level.

In addition, in the embodiment, since the engine 202 is a water-cooling engine and the pair of cylinders 204 and 205 that constitute the V-bank are water-cooled, a thermal influence of the cylinders 204 and 205 on the clutch actuator 80 can be minimized.

<Variant Example of Second Embodiment>

Next, a variant example of the second embodiment will be described. Further, in the following variant example, portions the same as in the second embodiment are designated by the same reference numerals and description thereof will be omitted.

<First Variant Example of Second Embodiment>

Figure 11:
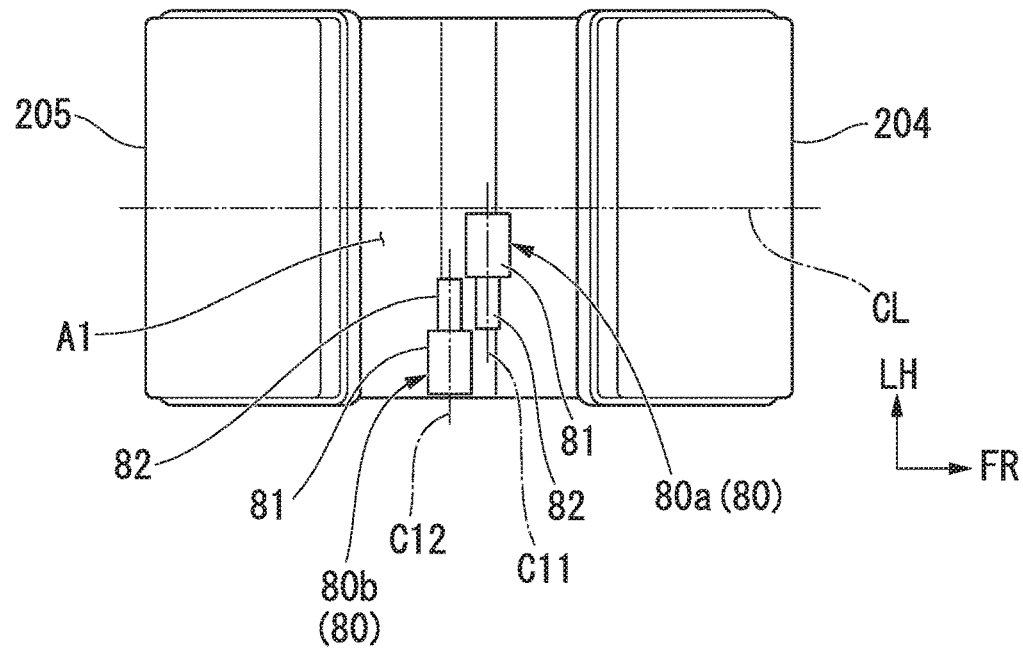
FIG. 11 is a plan view showing disposition of a clutch actuator according to a first variant example of the second embodiment.

While an example in which the two clutch actuators 80a and 80b are disposed to overlap each other in the forward/rearward direction entirely has been described in the second embodiment, there is no limitation thereto. For example, as shown in FIG. 11, the two clutch actuators 80a and 80b may be disposed to partially overlap each other in the forward/rearward direction. In the variant example, the clutch actuators 80a and 80b are disposed to be allocated to left and right sides further rightward than the centerline CL in the cylinder width direction in the width of the pair of cylinders 204 and 205.

The clutch actuators 80a and 80b are disposed further rightward than the centerline CL in the cylinder width direction in the width of the pair of cylinders 204 and 205 such that the valve body section 82 is disposed to be positioned at a center in the vehicle width direction. The clutch actuators 80a and 80b are disposed such that the valve body sections 82 overlap each other in the forward/rearward direction. The clutch actuators 80a and 80b are disposed such that the valve body sections 82 are close to each other.

According to the variant example, since the two clutch actuators 80 are disposed such that the valve body sections 82 are close to each other, in comparison with the case in which the two clutch actuators 80 are disposed such that the electromagnetic coil sections 81 are close to each other, an occupation area taken up by the two clutch actuators 80 can be decreased. For this reason, the two clutch actuators 80 can be easily accommodated within the region A1 of the V-bank, and a degree of freedom when disposing the two clutch actuators 80 can be increased.

<Second Variant Example of Second Embodiment>

Figure 12:
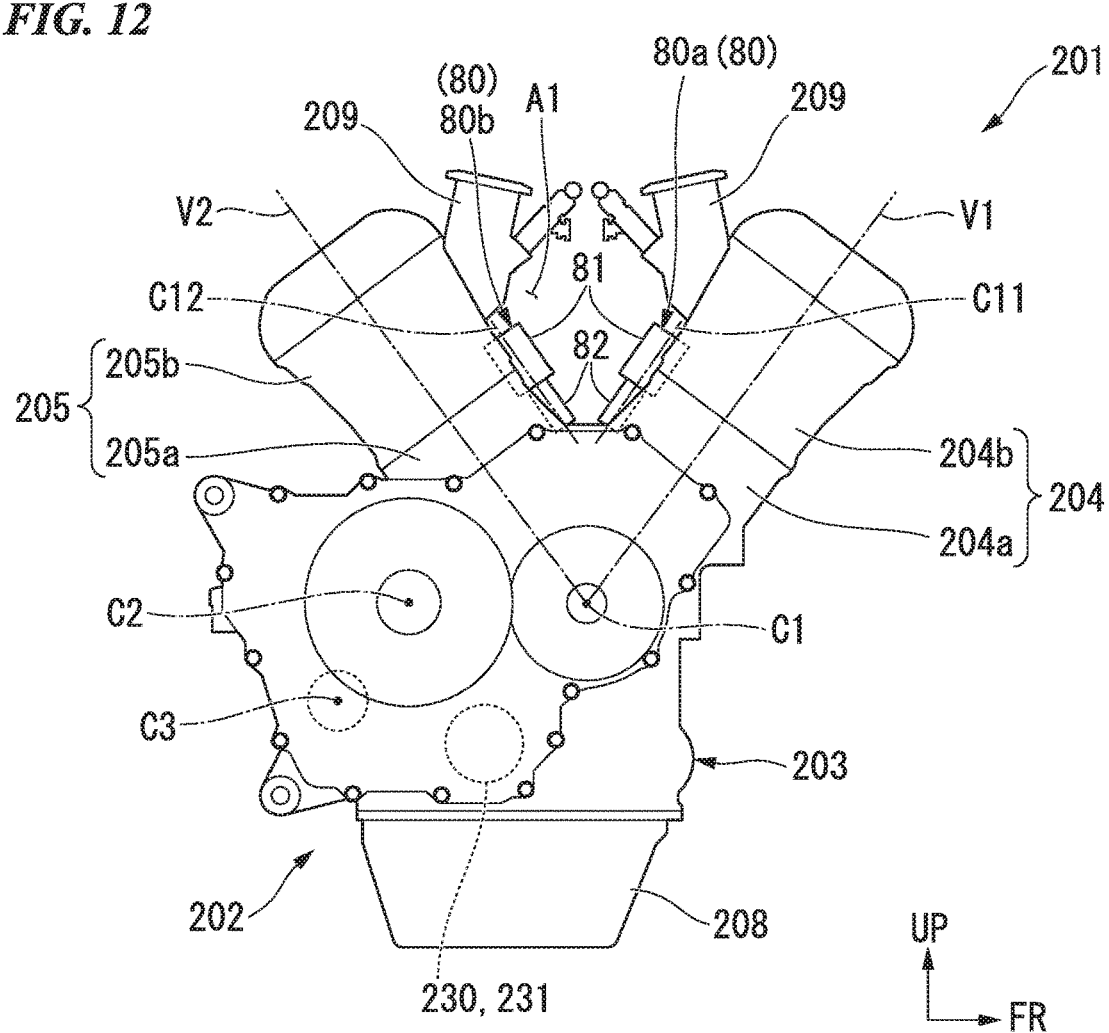
FIG. 12 is a right side view showing disposition of a clutch actuator according to a second variant example of the second embodiment.

While an example in which the two clutch actuators 80a and 80b are disposed such that the valve body sections 82 are close to each other has been described in a first variant example of the second embodiment, there is no limitation thereto. For example, as shown in FIG. 12, the two clutch actuators 80a and 80b may be disposed such that the valve body sections 82 are separated from each other. In the variant example, the clutch actuators 80a and 80b are disposed to be allocated to the pair of cylinders 204 and 205, respectively.

The clutch actuators 80a and 80b are disposed so as to be parallel with respect to the axes V1 and V2 of the pair of cylinders 204 and 205 (the cylinder axes V1 and V2).

Specifically, the first clutch actuator 80a is disposed along the forward-inclined cylinder 204. That is, the first clutch actuator 80a is installed on a rear wall surface of the forward-inclined cylinder 204 such that an axis C11 thereof is parallel to the axis V1 of the forward-inclined cylinder 204 (the forward-inclined cylinder axis V1).

Meanwhile, the second clutch actuator 80b is disposed along the rearward-inclined cylinder 205. That is, the second clutch actuator 80b is installed on a front wall surface of the rearward-inclined cylinder 205 such that an axis C12 thereof is parallel to the axis V2 of the rearward-inclined cylinder 205 (the rearward-inclined cylinder axis V2).

Figure 13:
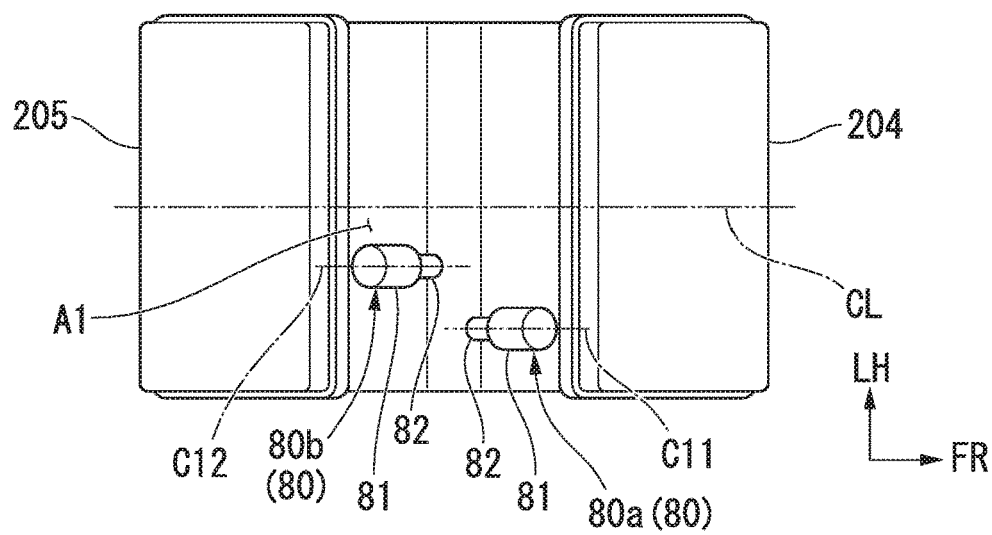
FIG. 13 is a plan view showing disposition of the clutch actuator according to the second variant example of the second embodiment.

As shown in FIG. 13, the two clutch actuators 80a and 80b are disposed to be allocated to left and right sides at the right than the centerline CL in the cylinder width direction within the width of the pair of cylinders 204 and 205. The clutch actuators 80a and 80b are disposed at the right side than the centerline CL in the cylinder width direction within the width of the pair of cylinders 204 and 205 such that the valve body section 82 is disposed at a center in the forward/rearward direction. The clutch actuators 80a and 80b are disposed such that the valve body sections 82 are separated from each other in the forward/rearward direction and the vehicle width direction.

According to the variant example, since the clutch actuators 80 are disposed to be allocated to the pair of cylinders 204 and 205, in comparison with the case in which the clutch actuators 80 are collectively disposed in one cylinder, a cooling property of the clutch actuators 80 can be secured.

<Third Variant Example of Second Embodiment>

Figure 14:
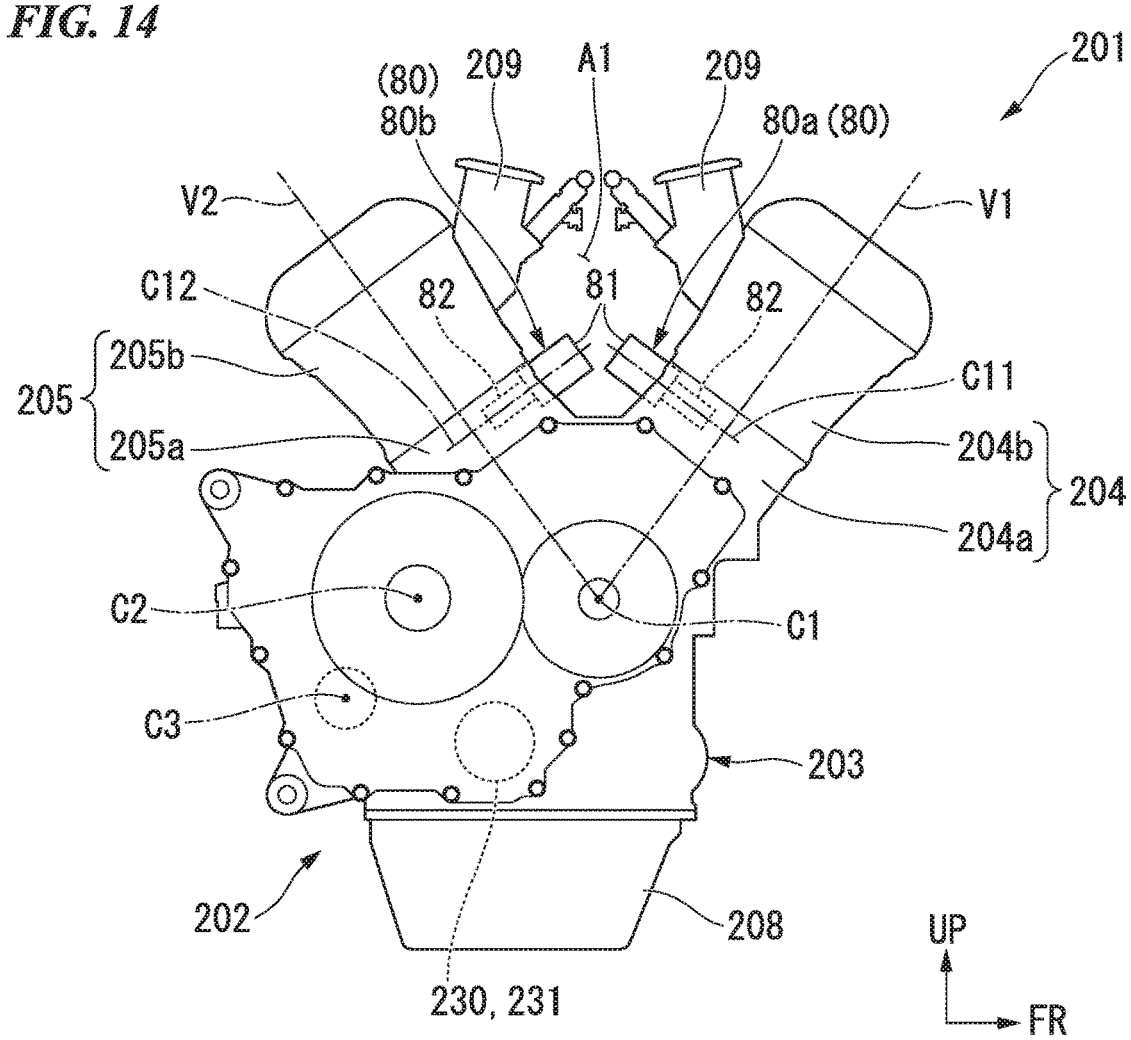
FIG. 14 is a right side view showing disposition of a clutch actuator according to a third variant example of the second embodiment.

While an example in which the clutch actuators 80a and 80b are disposed parallel with respect to the axes V1 and V2 of the pair of cylinders 204 and 205, respectively, in the second variant example of the second embodiment has been exemplarily described, there is no limitation thereto. For example, as shown in FIG. 14, the clutch actuators 80a and 80b may be disposed to be perpendicular with respect to the axes V1 and V2 of the pair of cylinders 204 and 205, respectively.

Specifically, the first clutch actuator 80a is installed on the rear wall surface of the forward-inclined cylinder 204 such that the axis C11 is perpendicular to the axis V1 of the forward-inclined cylinder 204. For example, a mounting seat of the first clutch actuator 80a is installed on the rear wall surface of the forward-inclined cylinder 204.

Meanwhile, the second clutch actuator 80b is installed on the front wall surface of the rearward-inclined cylinder 205 such that the axis C12 is perpendicular to the axis V2 of the rearward-inclined cylinder 205. For example, a mounting seat of the second clutch actuator 80b is installed on the front wall surface of the rearward-inclined cylinder 205.

Further, the clutch actuators 80a and 80b may be disposed to cross the axes V1 and V2 of the pair of cylinders 204 and 205. For example, the clutch actuators 80a and 80b may be disposed to cross the axes V1 and V2 of the pair of cylinders 204 and 205 within a range of 45 degrees or more and 135 degrees or less.

Figure 15:
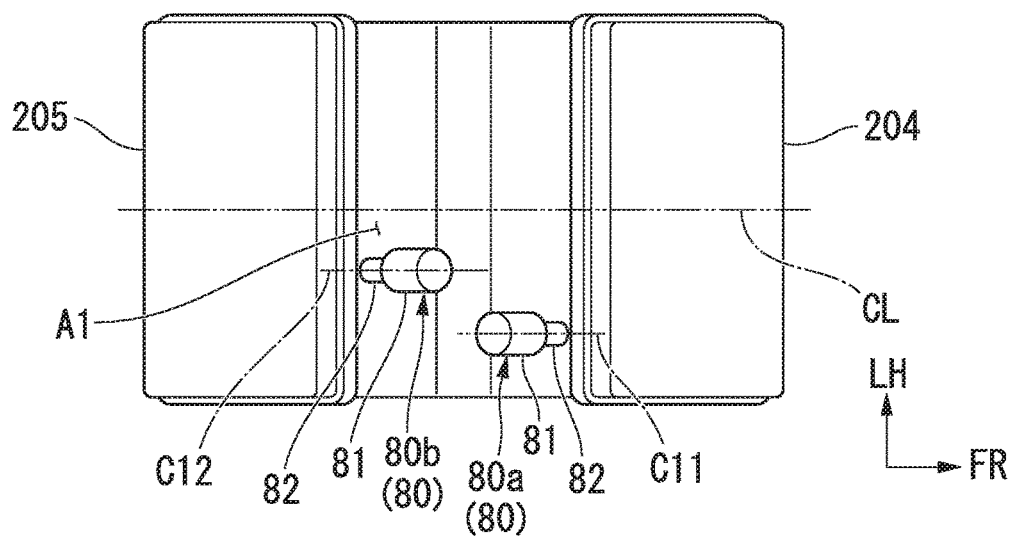
FIG. 15 is a plan view showing disposition of the clutch actuator according to the third variant example of the second embodiment.

As shown in FIG. 15, the two clutch actuators 80a and 80b are disposed to be allocated to left and rights sides at the right than the centerline CL in the cylinder width direction within the width of the pair of cylinders 204 and 205. The clutch actuators 80a and 80b are disposed at the right side of the centerline CL in the cylinder width direction in the width of the pair of cylinders 204 and 205 such that the electromagnetic coil section 81 is disposed at a center in the forward/rearward direction. The clutch actuators 80a and 80b are disposed such that the electromagnetic coil sections 81 are separated from each other in the forward/rearward direction and the vehicle width direction.

According to the variant example, since the clutch actuators 80 are disposed to be allocated to the pair of cylinders 204 and 205, respectively in comparison with the case in which the clutch actuators 80 are collectively disposed in one cylinder, a cooling property of the clutch actuators 80 can be secured.

<Fourth Variant Example of Second Embodiment>

Figure 16:
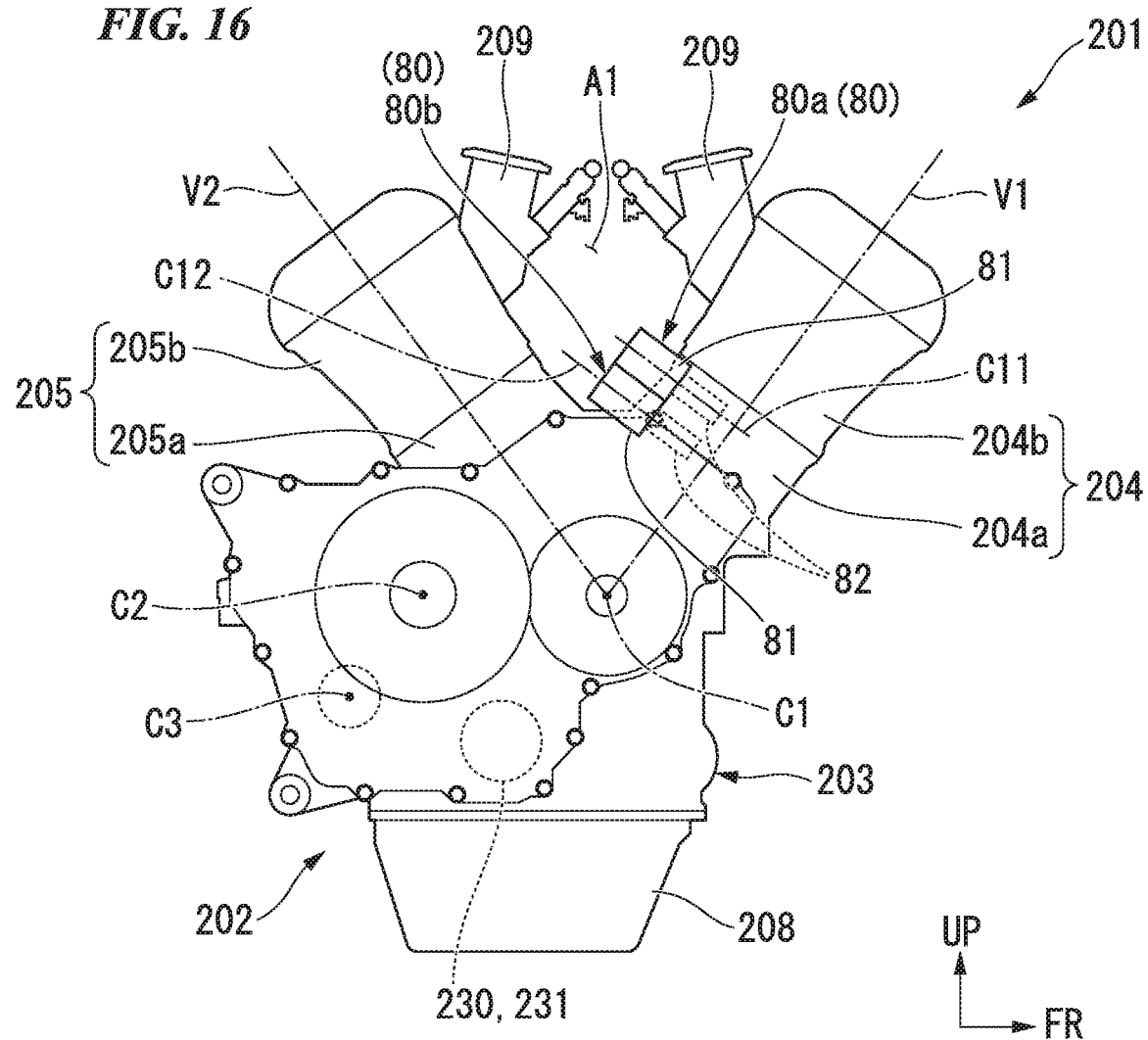
FIG. 16 is a right side view showing disposition of a clutch actuator according to a fourth variant example of the second embodiment.

While an example in which the clutch actuators 80a and 80b are disposed to be allocated to the pair of cylinders 204 and 205 in the second variant example of the second embodiment has been exemplarily described, there is no limitation thereto. For example, as shown in FIG. 16, the clutch actuators 80a and 80b may be disposed parallel to the forward-inclined cylinder 204.

In the variant example, the clutch actuators 80a and 80b are disposed on the forward-inclined cylinder 204 only. The clutch actuators 80a and 80b are installed on the rear wall surface of the forward-inclined cylinder 204 such that the axes C11 and C12 are perpendicular to the axis V1 of the forward-inclined cylinder 204. For example, mounting seats of the clutch actuators 80a and 80b are installed on the rear wall surface of the forward-inclined cylinder 204.

The first clutch actuator 80a is disposed above the second clutch actuator 80b. Further, the clutch actuators 80a and 80b may be disposed with top and bottom portions thereof exchanged.

According to the variant example, since the two clutch actuators 80 are installed and the two clutch actuators 80 are disposed parallel to the forward-inclined cylinder 204 in the pair of cylinders 204 and 205 that constitute the V-bank, since the oil passages are collectively provided, simplification of the oil passages can be achieved.

Further, the clutch actuators 80a and 80b may be disposed parallel to the rearward-inclined cylinder 205. That is, the clutch actuators 80a and 80b may be disposed parallel to one of the pair of cylinders 204 and 205.

<Fifth Variant Example of Second Embodiment>

Figure 17:
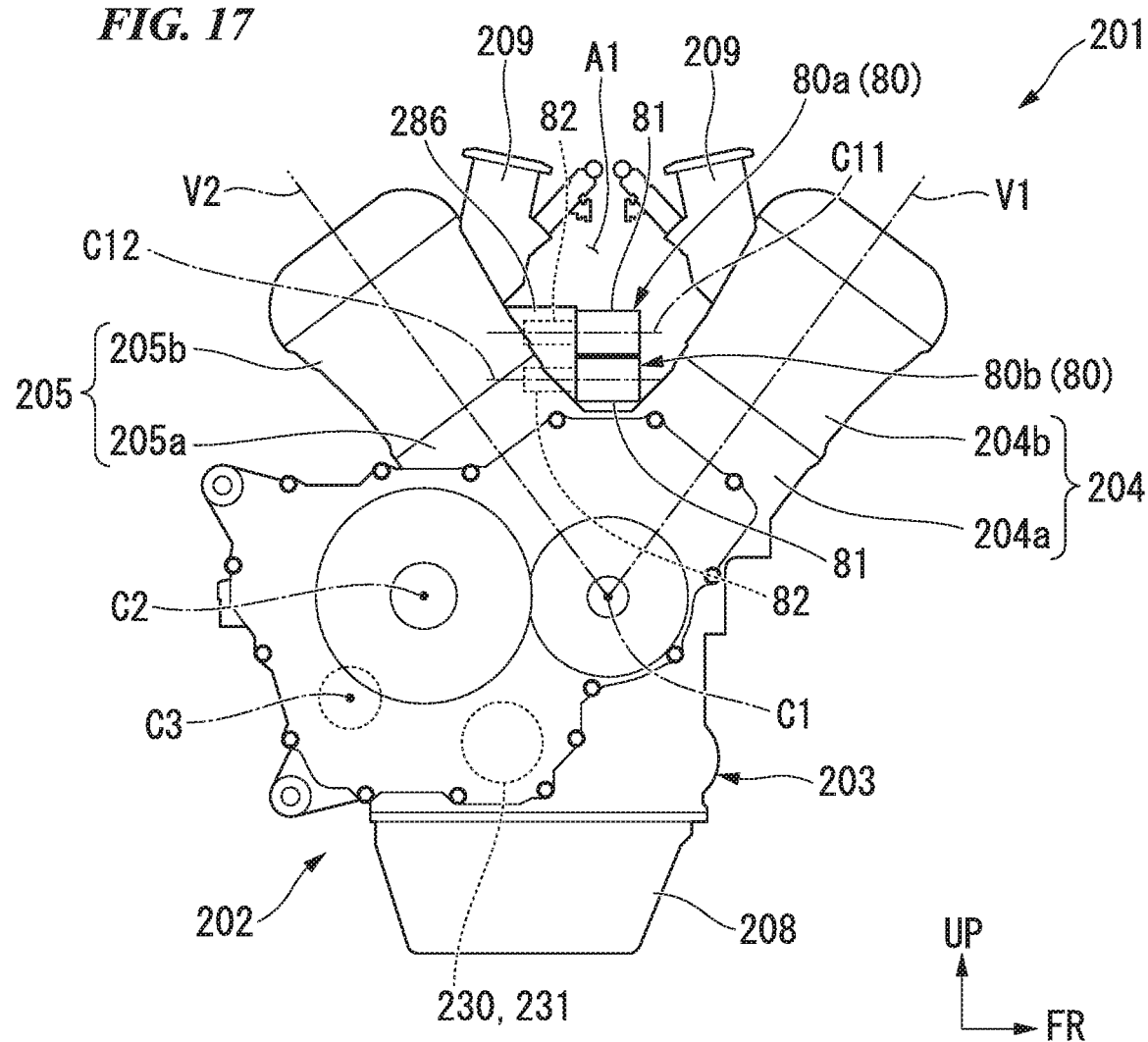
FIG. 17 is a right side view showing disposition of a clutch actuator according to a fifth variant example of the second embodiment.

While an example in which the clutch actuators 80a and 80b are disposed on the forward-inclined cylinder 204 only has been exemplarily described in the fourth variant example of the second embodiment, there is no limitation thereto. For example, as shown in FIG. 17, the clutch actuators 80a and 80b may be disposed on the rearward-inclined cylinder 205 only.

In the variant example, the clutch actuators 80a and 80b are disposed parallel to each other in the vertical direction while the axes C11 and C12 are arranged in the forward/rearward direction. The clutch actuators 80a and 80b are attached to an actuator installation section 286 of a front wall surface of the rearward-inclined cylinder 205. The actuator installation section 286 protrudes forward from the front wall surface of the rearward-inclined cylinder 205. Insertion holes into which the valve body sections 82 of the clutch actuators 80a and 80b can be inserted are formed in the actuator installation section 286. That is, the valve body sections 82 of the clutch actuators 80a and 80b are inserted and fixed into the insertion holes of the actuator installation section 286.

The first clutch actuator 80a is disposed above the second clutch actuator 80b. Further, the clutch actuators 80a and 80b may be disposed by switching their positions in the vertical direction.

According to the variant example, as the two clutch actuators 80 are installed and the two clutch actuators 80 are disposed parallel to the rearward-inclined cylinder 205 included in the pair of cylinders 204 and 205 that constitute the V-bank, since the oil passage can be collectively provided, simplification of the oil passages can be achieved.

<Sixth Variant Example of Second Embodiment>

Figure 18:
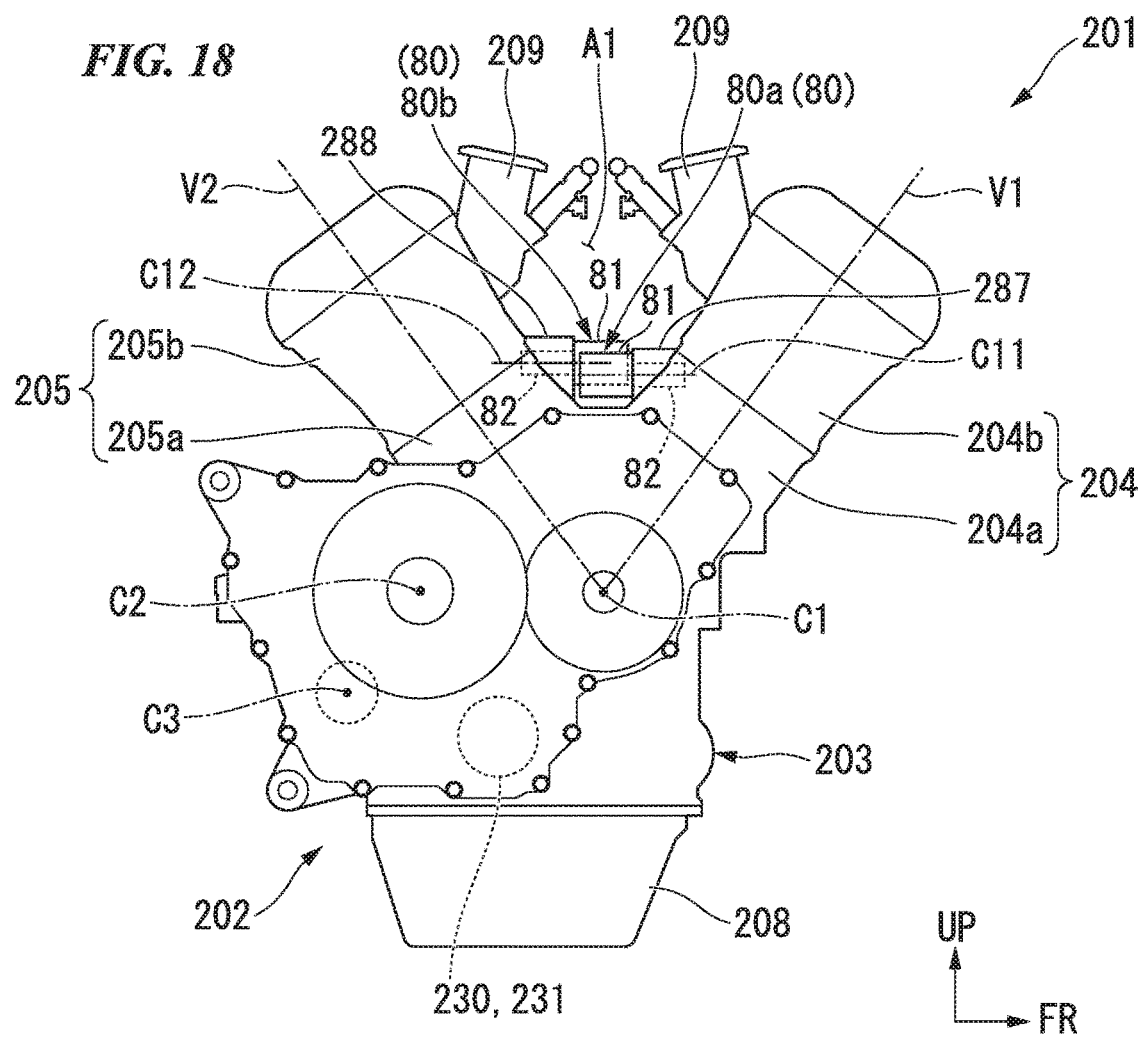
FIG. 18 is a right side view showing disposition of a clutch actuator according to a sixth variant example of the second embodiment.

While an example in which the clutch actuators 80a and 80b are disposed to be allocated to the pair of cylinders 204 and 205 so as to be in parallel with the axes V1 and V2 of the pair of cylinders 204 and 205 has been described in the second variant example of the second embodiment, there is no limitation thereto. For example, as shown in FIG. 18, the clutch actuators 80a and 80b may be disposed to be allocated to the pair of cylinders 204 and 205 so that the axes C11 and C12 are set in the forward/rearward direction.

In the variant example, the clutch actuators 80a and 80b are attached to actuator installation sections 287 and 288 (a front actuator installation section 287 and a rear actuator installation section 288) of wall surfaces of the pair of cylinders 204 and 205, respectively. The front actuator installation section 287 protrudes rearward from the rear wall surface of the forward-inclined cylinder 204. The rear actuator installation section 288 protrudes forward from the front wall surface of the rearward-inclined cylinder 205 at inside of the front actuator installation section 287 in the vehicle width direction.

The front and rear actuator installation sections 287 and 288 are formed in a block shape having a diameter larger than that of the electromagnetic coil section 81. Insertion holes in which the valve body sections 82 of the clutch actuators 80a and 80b can be inserted are formed in the front and rear actuator installation sections 287 and 288. That is, the valve body sections 82 of the clutch actuators 80a and 80b are inserted and fixed into the insertion holes of the front and rear actuator installation sections 287 and 288.

Figure 19:
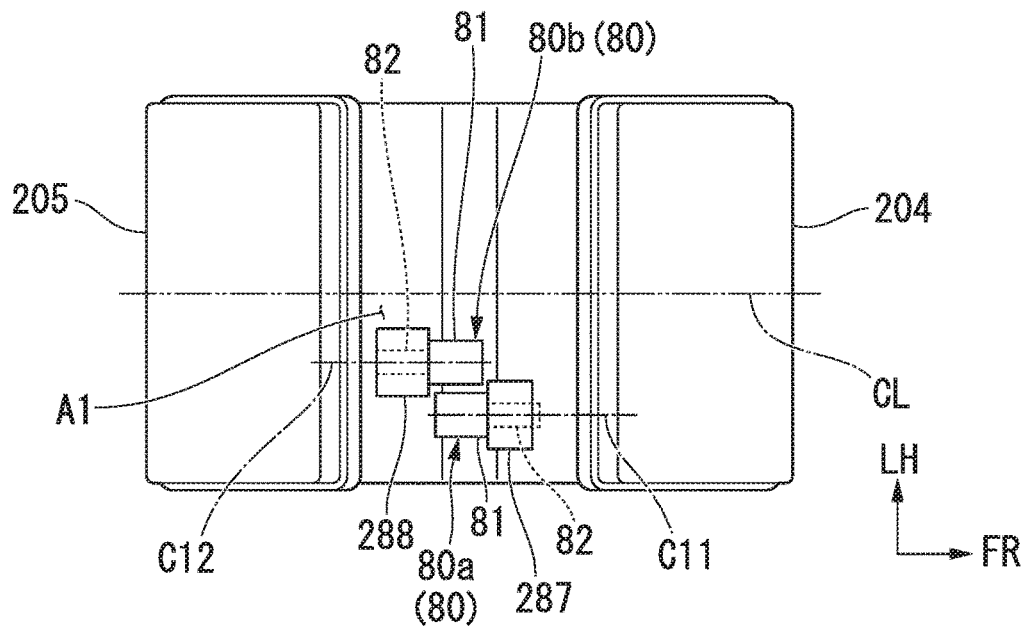
FIG. 19 is a plan view showing disposition of a clutch actuator of a seventh variant example of the second embodiment.

As shown in FIG. 19, the two clutch actuators 80a and 80b are disposed to be allocated on left and right sides at the right than the centerline CL in the cylinder width direction within the width of the pair of cylinders 204 and 205. The clutch actuators 80a and 80b are disposed at the right side than the centerline CL in the cylinder width direction within the width of the pair of cylinders 204 and 205 such that the electromagnetic coil section 81 is disposed at a center in the forward/rearward direction. The electromagnetic coil sections 81 have a diameter smaller than the front and rear actuator installation sections 287 and 288. The clutch actuators 80a and 80b are disposed such that the electromagnetic coil sections 81 are close to each other in the forward/rearward direction and the vehicle width direction.

According to the variant example, since the electromagnetic coil sections 81 have a diameter smaller than the front and rear actuator installation sections 287 and 288 and the two clutch actuators 80 are disposed in a state the electromagnetic coil sections 81 are close to each other, in comparison with the case in which the front and rear actuator installation sections 287 and 288 are disposed to be close to each other, an occupation area taken up by the two clutch actuators 80 can be reduced. For this reason, the two clutch actuators 80 can be easily accommodated within the region A1 of the V-bank, and a degree of freedom when disposing the two clutch actuators 80 can be increased.

In particular, in the variant example, since the clutch actuators 80 have the axes C11 and C12 disposed in the forward/rearward direction, reduction in lateral width of the region A1 in the V-bank can be achieved.

In addition, since the clutch actuators 80 are disposed to be allocated to the pair of cylinders 204 and 205, in comparison with the case in which the clutch actuators 80 are collectively disposed in one cylinder, a cooling performance of the clutch actuators 80 can be secured.

Further, while an example in which both of the clutch actuators 80 are accommodated within the width of the pair of cylinders 204 and 205 that constitute the V-bank has been exemplarily described in the embodiment, there is no limitation thereto. For example, portion of the clutch actuators 80 may protrude outside of the width of the pair of cylinders 204 and 205 that constitute the V-bank. That is, when seen in a plan view, at least portion of the clutch actuator 80 may be installed on the crankcase or the cylinder so that the portion of the clutch actuator overlaps with the region A1 of the V-bank.

In addition, while an example in which the engine is a V type two-cylinder engine having the crank axis C1 in the vehicle width direction has been exemplarily described in the embodiment, there is no limitation thereto. For example, the engine may be a V type four-cylinder engine having a crank axis C1 in the vehicle width direction. In addition, the engine may be configured to have the crank axis C1 in the forward/rearward direction. That is, the engine may include a plurality of cylinders installed on a crankcase such that a V-bank is formed therebetween.

In addition, while an example in which the two clutch actuators 80 are installed has been exemplarily described in the embodiment, there is no limitation thereto. For example, one clutch actuator 80 may be installed alone. In addition, three or more clutch actuators 80 may be provided. That is, the number of clutch actuators 80 may be appropriately changed according to design specification.

Further, the present invention is not limited to the embodiment and, for example, the clutch actuator may control mechanical power or electrical power other than supply hydraulic pressure to the clutch, and similarly, a linking means between the clutch and the clutch actuator may be a mechanical or electrical path rather than a hydraulic pressure path.

In addition, the engine is not limited to a so-called transverse engine having a crankshaft in the vehicle width direction and may be a so-called longitudinal engine having a crankshaft in the vehicle forward/rearward direction, and also in this case, disposition of the cylinders is variously modified. Further, the power unit may include an electrical motor as a drive source.

In addition, the vehicle is not limited to a motorcycle (including a prime-mover-attached bicycle and a scooter type vehicle) and also includes a three-wheeled vehicle (including a two-front-wheeled and one-rear-wheeled vehicle and a one-front-wheeled and two-rear-wheeled vehicle).

In addition, the present invention is not limited to a motorcycle and may also be applied to a four-wheeled vehicle such as an automobile or the like.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A power unit for a vehicle comprising:
   an internal combustion engine that is a power source,
   a transmission device,
   a clutch apparatus that intermittently switches power transmission between the internal combustion engine and the transmission device, and
   a clutch actuator that controls intermittent switching of the clutch apparatus,
   wherein the internal combustion engine comprises a crankcase, and a plurality of cylinders installed on the crankcase so that a V-bank is formed therebetween,
   at least a portion of the clutch actuator is installed on the crankcase or the cylinder so that the portion of the clutch actuator overlaps with a region of the V-bank when seen in a plan view,
   an actuator installation section is provided at an upper section of the crankcase in between the V-bank, and
   the clutch actuator is inserted and fixed into an insertion hole which is formed in the actuator installation section in a state in which the clutch actuator protrudes from a surface of the crankcase into the region of the V-bank.

2. The power unit for a vehicle according to claim 1, wherein entire of the clutch actuator is accommodated within a width of a pair of cylinders that constitute the V-bank.

3. The power unit for a vehicle according to claim 1, wherein a plurality of clutch actuators are disposed such that at least a portion of each of the clutch actuators overlap with each other when seen in a plan view.

4. The power unit for a vehicle according to claim 1, wherein a plurality of clutch actuators are disposed parallel and adjacent to each other when seen in a plan view.

5. The power unit for a vehicle according to claim 3, wherein the clutch actuator comprises an electromagnetic coil section, and a valve body section having a diameter smaller than the electromagnetic coil section, and the plurality of clutch actuators are disposed in a state the valve body sections are close to each other.

6. The power unit for a vehicle according to claim 1, wherein the clutch actuator is disposed to stand up on the crankcase positioned on a bottom section of the region of the V-bank.

7. The power unit for a vehicle according to claim 1, wherein a plurality of clutch actuators are disposed parallel to any one of the pair of cylinders that constitute the V-bank.

8. The power unit for a vehicle according to claim 1, wherein the internal combustion engine is a water-cooling engine, and the pair of cylinders that constitute the V-bank are water-cooled.

* * * * *